(12) United States Patent
Fehrenbach et al.

(10) Patent No.: US 11,329,777 B2
(45) Date of Patent: May 10, 2022

(54) DATA COMMUNICATION APPARATUSES, DATA COMMUNICATION SYSTEM AND METHODS USING REFERENCE SYMBOLS

(71) Applicant: Fraunhofer-Gesellschaft zur Foerderung der angewandten Forschung e.V., Munich (DE)

(72) Inventors: Thomas Fehrenbach, Berlin (DE); Thomas Wirth, Kleinmachnow (DE); Baris Goektepe, Berlin (DE); Dennis Wieruch, Berlin (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 16/272,649

(22) Filed: Feb. 11, 2019

(65) Prior Publication Data

US 2019/0296872 A1    Sep. 26, 2019

Related U.S. Application Data

(63) Continuation of application No. PCT/EP2017/070260, filed on Aug. 9, 2017.

(30) Foreign Application Priority Data

Aug. 11, 2016 (EP) .................................... 16183896

(51) Int. Cl.
 *H04W 72/12* (2009.01)
 *H04L 5/00* (2006.01)
 *H04L 1/00* (2006.01)

(52) U.S. Cl.
 CPC .......... *H04L 5/0048* (2013.01); *H04L 5/0053* (2013.01); *H04L 5/0094* (2013.01);
 (Continued)

(58) Field of Classification Search
 CPC ... H04L 5/0048; H04L 5/0053; H04L 5/0094; H04L 1/00; H04L 5/0007; H04L 1/0026; H04L 5/00; H04W 72/1205
 See application file for complete search history.

(56) References Cited

U.S. PATENT DOCUMENTS

| | | | |
|---|---|---|---|
| 8,203,929 | B2 | 6/2012 | Atungsiri et al. |
| 2013/0208678 | A1 | 8/2013 | Zhang |

(Continued)

FOREIGN PATENT DOCUMENTS

| | | |
|---|---|---|
| CN | 102549997 A | 7/2012 |
| CN | 104685954 A | 6/2015 |

(Continued)

OTHER PUBLICATIONS

Kundu et al., Physical Uplink Control Channel Design for 5G New Radio, 2016.*

(Continued)

*Primary Examiner* — Jay P Patel
(74) *Attorney, Agent, or Firm* — Perkins Coie LLP; Michael A. Glenn

(57) ABSTRACT

A data communication apparatus, for transmitting one or more blocks of data within a frame including a two-dimensional grid of transmission symbol positions is configured to select a group of transmission symbol positions, which is a subset of the two-dimensional grid of transmission symbol positions, for a transmission of a data portion. The data communication apparatus is configured to select one or more reference symbol positions associated to the selected group of transmission symbol positions, out of a plurality of possibilities, based on an information describing a desired relative position of the reference symbol position with respect to the selected group of transmission symbol positions. Other apparatuses also use a flexible selection of transmission symbol positions and a flexible selection of (Continued)

reference symbol positions. A system, methods and computer programs are also described.

15 Claims, 26 Drawing Sheets

(52) U.S. Cl.
CPC .......... *H04W 72/1205* (2013.01); *H04L 1/00* (2013.01); *H04L 5/0007* (2013.01)

(56) References Cited

U.S. PATENT DOCUMENTS

| | | | | |
|---|---|---|---|---|
| 2013/0279437 A1* | 10/2013 | Ng | ........................ | H04W 48/12 370/329 |
| 2013/0294366 A1 | 11/2013 | Papasakellariou et al. | | |
| 2015/0173101 A1 | 6/2015 | Webb et al. | | |
| 2015/0201369 A1* | 7/2015 | Ng | ........................ | H04W 48/12 370/254 |
| 2015/0230211 A1* | 8/2015 | You | ........................ | H04W 72/04 370/330 |
| 2016/0006548 A1* | 1/2016 | Yang | ........................ | H04L 1/1812 370/329 |
| 2016/0065390 A1* | 3/2016 | Kim | ........................ | H04L 25/03159 375/260 |
| 2016/0112994 A1* | 4/2016 | Wang | ........................ | H04L 5/0094 370/329 |
| 2016/0127997 A1* | 5/2016 | Ang | ........................ | H04W 76/28 370/311 |
| 2016/0128056 A1* | 5/2016 | Jiang | ........................ | H04L 5/0092 370/329 |
| 2016/0270059 A1* | 9/2016 | Chen | ........................ | H04L 5/0051 |
| 2017/0171842 A1* | 6/2017 | You | ........................ | H04L 5/0048 |
| 2017/0230994 A1* | 8/2017 | You | ........................ | H04L 5/0053 |
| 2017/0366311 A1* | 12/2017 | Iyer | ........................ | H04L 5/0007 |
| 2018/0212732 A1* | 7/2018 | You | ........................ | H04L 5/0091 |
| 2018/0241524 A1* | 8/2018 | Andersson | ............ | H04L 5/0048 |
| 2018/0242347 A1* | 8/2018 | Sahlin | ................... | H04W 72/14 |
| 2018/0323830 A1* | 11/2018 | Park | ........................ | H04B 7/024 |
| 2019/0028162 A1* | 1/2019 | Lee | ........................ | H04L 1/1861 |
| 2019/0097782 A1* | 3/2019 | Horiuchi | ............... | H04L 5/0033 |
| 2019/0098562 A1* | 3/2019 | Ng | ........................ | H04L 25/0224 |
| 2019/0116583 A1* | 4/2019 | Sahlin | ................... | H04L 5/0092 |
| 2019/0268934 A1* | 8/2019 | Korhonen | ............. | H04L 5/0094 |
| 2019/0312669 A1* | 10/2019 | Kwak | ........................ | H04L 1/00 |
| 2020/0112981 A1* | 4/2020 | Sahlin | ................... | H04L 5/0044 |

FOREIGN PATENT DOCUMENTS

| | | |
|---|---|---|
| EP | 3029848 A1 | 6/2016 |
| JP | 2010093817 A | 4/2010 |
| RU | 2462823 C2 | 9/2012 |
| WO | 2007025160 A2 | 3/2007 |
| WO | WO-2013086946 A1 * | 6/2013 ......... H04L 27/2613 |
| WO | 2016021880 A1 | 2/2016 |

OTHER PUBLICATIONS

Ericsson, "Physical design aspects of sPUSCH [online]", 3GPP TSG-RAN WG1#85 R1-165296, May 13, 2016, Internet <URL: http://www.3gpp.org/ftp/tsg_ran/WG1_RL1/TSGR1_1402/Docs/R1-165296.zip, May 13, 2016.

Mitsubishi Electric, "Reducing UL RS overhead for sPUSCH [online]", 3GPP TSG-RAN WG1 #85 R1-164115, May 13, 2016, Internet <URL: http://www.3gpp.org/ftp/tsg_ran/WG1_RL1/TSGR1_239/Docs/R1-164115.zip, May 13, 2016.

NTT Docomo, Inc., "sPUSCH for shortened TTI [online]", 3GPP TSG-RAN WG1#85 R1-165211, May 14, 2016, Internet <URL: http://3gpp.org/ftp/tsg_ran/WG1_RL1/TSGR1_1318/Docs/R1-165211.zip, May 14, 2016.

Intel Corporation, "UL design aspects of TTI shortening", 3GPP Draft; R1-164162, 3rd Generation Partnership Project (3GPP), Mobile Competence Centre; 650, Route des Lucioles; F-06921 Sophia-Antipolis Cedex; France, vol. RAN WG1, China, May 2016, XP051096556, May 2016, 3 pp.

3GPP TS 36.211, "Physical Channels and Modulation (Release 11)", 3GPP TS 36.211 V11.0.0 (Sep. 19, 2012), Sep. 19, 2012, 106 pp.

3rd Generation Partnership Proje, "Technical Specification Group Radio Access Network; Evolved Universal Terrestrial Radio Access (E-UTRA); Medium Access Control (MAC) protocol specification (Release 13)", 3GPP TS 36.321 V13.1.0 (Mar. 2016), 650 Route des Lucioles—Sophia Antipolis Valbonne—France, The present p. 42ff., 2016.

3rd Generation Partnership Proje, "Technical Specification Group Radio Access Network; Evolved Universal Terrestrial Radio Access (E-UTRA); Physical channels and modulation (Release 13)", 3GPP Standard; 3GPP TS 36.211, 3rd Generation Partnership Project (3GPP), Mobile Competence Centre; 650, Route Des Lucioles ; F-06921 Sophia-Antipolis Cedex ; France, vol. RAN WG1, No. V13.2.0, XP051123204, Jul. 1, 2016, pp. 1-168.

3rd Generation Partnership Proje, "Technical Specification Group Radio Access Network; Evolved Universal Terrestrial Radio Access (E-UTRA); Radio Resource Control (RRC); Protocol specification (Release 13)", 3GPP TS 36.331 V13.1.0 (Mar. 2016), 650 Route des Lucioles—Sophia Antipolis Valbonne—France, Mar. 2016, p. 354.

Ericsson, Qualcomm, "Way forward on DMRS for sPUSCH", 3GPP R1-163723, Ericsson, Qualcomm, Apr. 11-15, 2016, Seoul, Korea, Apr. 25, 2016.

Intel Corporation, "Downlink control singaling design for shorten TTI", vol. RAN WG1, No. Nanjing, China; May 23, 2016-May 27, 2016, (May 14, 2016), 3GPP Draft; R1-164160, 3rd Generation Partnership Project (3GPP), Mobile Competence Centre ; 650, Route Des Lucioles ; F-06921 Sophia-Antipolis Cedex ; France, URL: http://www.3gpp.org/ftp/tsg_ran/WG1_RL1/TSGR1_85/Docs/, (May 14, 2016), XP051096558, 2016.

* cited by examiner

Example of an uplink subframe with sTTI length 3/4 and 2 OFDM symbols

Multiplexing of UEs with different bandwidth allocations

Multiplexing of UEs with different transmission lengths

Combination of DMRS multiplexing for a multi-user scenario over frequency and time domains.

ICIC for DMRS sequences by introducing orthogonal groups

Example implementation of two patterns. Where A-D are different users transmitting.

Example assignment of TTI length and DMRS position in frequency and time on an LTE resource grid.

| Format 0 (Release 8) - C-RNTI, SPS C-RNTI | | |
|---|---|---|
| Field Name | Length | Comment |
| Flag for format0/format1A differentiation | 1 | |
| Hopping flag | 1 | |
| N_ULhop | 1 (1.4 MHz)<br>1 (3 MHz)<br>1 (5 MHz)<br>2 (10 MHz)<br>2 (15 MHz)<br>2 (20 MHz) | Applicable only when Hopping flag is set.(Refer to 36.213 *Table 8.4-1* and *Table 8.4-2*) is. |
| Resource block assignment | 5 (1.4 MHz)<br>7 (3 MHz)<br>7 (5 MHz)<br>11 (10 MHz)<br>12 (15 MHz)<br>13 (20 MHz) | See *36.213 8.1* |
| MCS and RV | 5 | |
| NDI (New Data Indicator) | 1 | |
| TPC for PUSCH | 2 | See *Power Control* section |
| Cyclic shift for DMRS | 3 | Can be used for multiplexing |
| UL index (TDD only) | 2 | This field is present only for TDD operation with uplink-downlink configuration 0 |
| Downlink Assignment Index (DAI) | 2 | Only for TDD Operation with uplink-downlink configuration 1-6 |
| CQI request (1 bit) | 1 | Refer to *36.213 Table 7.3-X* |
| DMRS position | 1 | DMRS symbol position beginning/end of transmission |

*Table 1:* DCI Message with added 1-bit DCI position field

Fig. 13

| Format 0 (Release 8) - C-RNTI, SPS C-RNTI | | |
|---|---|---|
| Field Name | Length | Comment |
| Flag for format0/format1A differentiation | 1 | |
| Hopping flag | 1 | |
| N_ULhop | 1 (1.4 MHz)<br>1 (3 MHz)<br>1 (5 MHz)<br>2 (10 MHz)<br>2 (15 MHz)<br>2 (20 MHz) | Applicable only when Hopping flag is set.(Refer to 36.213 *Table 8.4-1* and *Table 8.4-2*) is. |
| Resource block assignment | 5 (1.4 MHz)<br>7 (3 MHz)<br>7 (5 MHz)<br>11 (10 MHz)<br>12 (15 MHz)<br>13 (20 MHz) | See *36.213 8.1* |
| MCS and RV | 5 | |
| NDI (New Data Indicator) | 1 | |
| TPC for PUSCH | 2 | See *Power Control* section |
| Cyclic shift for DMRS | 3 | Can be used for multiplexing |
| UL index (TDD only) | 2 | This field is present only for TDD operation with uplink-downlink configuration 0 |
| Downlink Assignment Index (DAI) | 2 | Only for TDD<br>Operation with uplink-downlink configuration 1-6 |
| CQI request (1 bit) | 1 | Refer to *36.213 Table 7.3-X* |
| DMRS position | 1 (2 symbol sTTI)<br>2 (3+ symbol sTTI) | DMRS symbol position or pattern from *Figure 3*.<br><br>1: front/back<br>   1a  1b<br><br>2: front, back, middle, front+back<br>e.g: 6a  6g  6d    5g |

*Table 2:* DCI Message with added 1-bit DCI position field

Fig. 14

|        | Group 1 | Group 2 | Group 3 |
|--------|---------|---------|---------|
| #1     | a       | e       | j       |
| #2     | b       | f       | i       |
| #3     | c       | g       | k       |
| #4     | d       | h       | l       |

*Table 3:* Grouping of DMRS multiplexing patterns

Fig. 15

| | |
|---|---|
| eNB | Evolved Node B (3G base station) |
| LTE | Long-Term Evolution |
| UE | User Equipment (User Terminal) |
| RRM | Radio Resource Management |
| TDD | Time Division Duplex |
| FDD | Frequency Division Duplex |
| MIMO | Multiple Input Multiple Output |
| OFDM | Orthogonal Frequency Division Duplexing |
| OFDMA | Orthogonal Frequency-Division Multiple Access |
| CQI | Channel Quality Information |
| CRC | Cyclic Redundancy Check |
| SPS | Semi-persistent Scheduling |
| DCI | Downlink Control Information |
| UL | Uplink |
| DL | Downlink |
| (s) TTI | (short) Transmission Time Interval |
| PUSCH | Physical Uplink Shared Channel |
| PUCCH | Physical Uplink Control Channel |
| PDSCH | Physical Downlink Shared Channel |
| PDCCH | Physical Downlink Control Channel |
| URLLC | Ultra-reliable Low-latency Communications |
| MBSFN | Multimedia Broadcast Single Frequency Network |
| C-RNTI | Cell Radio Network Temporary Identity |
| DMRS | Demodulation Reference Symbols |
| LTE | Long Term Evolution |
| OFDM | Orthogonal Frequency Division Multiplexing |
| PRB | Physical Resource Block |
| ICIC | Inter-Cell-Interference-Coordination |

Fig. 16

Selecting a group of transmission symbol positions which is a subset of the two-dimensional grid of transmission symbol positions for a transmission of a data portion (daten block)

Selecting one or more reference symbol positions associated to the selected group of transmission symbol positions, out of a plurality of possibilities, based on an information describing a desired relative position of the reference symbol positions with respect to the selected group of transmission symbol positions

Fig. 21

Selecting a group of transmission symbol positions, which is a subset of the two-dimensional grid of transmission symbol positions, for a transmission of a data portion, wherein one or more reference symbol positions are associated to the selected group of transmission symbol positions

Determining which one or more symbol positions are used as one or more reference symbol positions based on the selection of the group of transmission symbol positions or together with the selection of the group of transmission symbol positions, wherein the reference symbol positions are variable with respect to borders of time slots of the frame or with respect to borders of sub-frames of the frame, or wherein the one or more reference symbol positions are variable with respect to the selected group of transmission symbol positions

Fig. 22

Selecting a group of transmission symbol positions, which is a subset of the two-dimensional grid of transmission symbol positions, for a transmission of a data portion

Selecting a multiplexing characteristic of one or more reference symbols, which are associated to the selected group of transmission symbol positions, in dependence on the selection of the group of transmission symbol positions

Fig. 23

Selecting a group of transmission symbol positions (sTTI), which is a subset of the two-dimensional grid of transmission symbol positions, for a transmission of a data portion

Selecting a multiplexing characteristic of one or more reference symbols, which are associated to the selected group of transmission symbol positions, in dependence on a multiplexing group selection information defining a group of multiplexing characteristics, and in dependence on a multiplexing characteristic selection information defining which multiplexing characteristic out of a plurality of multiplexing characteristics contained in a group of multiplexing characteristics defined by the multiplexing group selection information should be used

Fig. 24

Selecting a group of transmission symbol positions (sTTI), which is a subset of the two-dimensional grid of transmission symbol positions, for a transmission of a data portion

Selecting a multiplexing characteristic of a plurality of reference symbols, which are associated to the selected group of transmission symbol positions, wherein the multiplexing characteristic is selected out of at least a first multiplexing pattern describing transmission symbol positions and a second multiplexing pattern describing transmission symbol positions, wherein the first multiplexing pattern comprises at least one shared transmission symbol position, which is also used by the second multiplexing pattern, and at least one exclusive transmission symbol position which is not used by the second multiplexing pattern, and wherein the second multiplexing pattern comprises the shared transmission symbol position and at least one exclusive transmission symbol position which is not used by the first multiplexing pattern.

Fig. 25

Signaling to the other data communication apparatuses which group of transmission symbol positions should be used by which of the other data communication apparatuses,

Providing an information describing a group of transmission symbol positions to be used by a given one of the other data communication apparatuses, and an information describing a desired relative position of reference symbol positions with respect to the group of transmission symbol positions to be used by the given one of the other data communication apparatuses

Fig. 26

Providing to the other data communication apparatuses a communication resource information, the communication resource information representing an allocation of transmission symbol positions and describing which group of transmission symbol positions should be used by which of the other data communication apparatuses and which of the transmission symbol positions should be used for a transmission of reference symbols by which of the other data communication apparatuses

Signaling different allocations of transmission symbol positions in dependence on a current communication state, wherein the transmission symbol positions to be used for the transmission of reference symbols are variable with respect to borders of time slots of the frame or with respect to borders of sub-frames of the frame between different allocations of transmission symbol positions, or wherein the transmission symbol positions to be used for the transmission of reference symbols are variable with respect a corresponding group of transmission symbol positions between different allocations of transmission symbol positions

Fig. 27

Providing to the other data communication apparatuses a communication resource information, the communication resource information representing an allocation of transmission symbol positions and describing which group of transmission symbol positions should be used by which of the other data communication apparatuses and which of the transmission symbol positions should be used for a transmission of reference symbols by which of the other data communication apparatuses,

Providing the communication resource information to at least two other data communication apparatuses, to cause a sharing between the at least two other data communication apparatuses of a transmission symbol position for a transmission of a reference symbol

Fig. 28

DATA COMMUNICATION APPARATUSES, DATA COMMUNICATION SYSTEM AND METHODS USING REFERENCE SYMBOLS

CROSS-REFERENCE TO RELATED APPLICATIONS

This application is a continuation of copending International Application No. PCT/EP2017/070260, filed Aug. 9, 2017, which is incorporated herein by reference in its entirety, and additionally claims priority from European Application No. EP 16183896.6, filed Aug. 11, 2016, which is incorporated herein by reference in its entirety.

Embodiments according to the invention are related to data communication apparatuses for transmitting one or more blocks of data within a frame comprising a two-dimensional grid of transmission symbol positions.

Further embodiments according to the invention are related to data communication apparatuses for receiving a plurality of blocks of data from other data communication apparatuses.

Other embodiments according to the invention are related to a data communication system.

Yet other embodiments according to the invention are related to a method for transmitting one or more blocks of data within a frame comprising a two-dimensional grid of transmission symbol positions and to a method for receiving a plurality of data blocks from other data communication apparatuses.

Other embodiments according to the invention are related to a data communication method.

Other embodiments according to the invention are related to a computer program for performing one of said methods.

BACKGROUND OF THE INVENTION

In some communication systems, latency reduction has become an important aspect for improvement.

Goal of latency reduction is to modify the radio frame structure, PHY and MAC protocols in order to reduce the delay in next generation mobile communication systems, e.g. 3GPP radio access technology (RAT). This is especially of interest for smaller file sizes. Reducing the transmission time interval (TTI) and processing time can significantly reduce the user plane latency, and improve the TCP throughput. In addition, smaller latency would allow UEs to reduce the L2 memory needed to buffer the "data in flight", allow for more robustness due to the ability to re-transit more often within a certain delay bound. This directly increases the perceived quality of experience for today's delay-sensitive real-time applications like gaming, voice or video telephony/conferencing, and allow addressing new future use cases such as critical MTC applications in a better way.

It has been found that reducing the number of resources used for the transmission of control symbols, e.g. reference symbols in the uplink, will allow a more efficient use of resources with more resources available for data channels. Thus, the latency on data channels is reduced. Control channel optimization can be achieved by multiplexing signals.

Ericsson and Qualcomm proposed to support the multiplexing of the Demodulation Reference Symbols (DMRS) of several User Equipments (UEs) when using the short Physical Uplink Shared Channel (sPUSCH) to reduce the overhead of transmitting pilot tones in the uplink.

A legacy LTE uplink subframe is shown in FIG. 1. Currently on the Physical Uplink Shared Channel (PUSCH). One UE occupies resources for 1 subframe consisting of 14 OFDM symbols. Each slot contains one DMRS symbol spanning the whole transmission bandwidth. In some subframes there can be a Sounding Reference Symbol (SRS) at the end. This depends on the SRS scheduling parameter settings.

In the 3GPP study item on latency reduction it is proposed to reduce the Transmission Time Interval (TTI) from 14 OFDM symbols (1 ms). Short TTIs with 2 or 3/3 OFDM symbols are up for discussion. FIG. 2 shows an example for sTTI length of ¾ and 2 Symbols. It has been found that the overhead for DMRS symbols becomes larger when moving to shorter TTI lengths.

In view of this situation, there is a desire to create concepts which allow for a better tradeoff between latency and resource efficiency.

SUMMARY

One embodiment may have a data communication apparatus, for transmitting one or more blocks of data within a frame including a two-dimensional grid of transmission symbol positions, wherein the data communication apparatus is configured to select a group of transmission symbol positions, which is a subset of the two-dimensional grid of transmission symbol positions, for a transmission of a data portion; and wherein the data communication apparatus is configured to select one or more reference symbol positions associated to the selected group of transmission symbol positions, out of a plurality of possibilities, based on an information describing a desired relative position of the reference symbol position with respect to the selected group of transmission symbol positions.

Another embodiment may have a data communication apparatus, for transmitting one or more blocks of data within a frame including a two-dimensional grid of transmission symbol positions, wherein the data communication apparatus is configured to select a group of transmission symbol positions, which is a subset of the two-dimensional grid of transmission symbol positions, for a transmission of a data portion, wherein one or more reference symbol positions are associated to the selected group of transmission symbol positions; wherein the data communication apparatus is configured to determine which one or more symbol positions are used as one or more reference symbol positions based on the selection of the group of transmission symbol positions or together with the selection of the group of transmission symbol positions; and wherein the reference symbol positions are variable with respect to one or more borders of time slots of the frame or with respect to one or more borders of sub-frames of the frame, and/or wherein the one or more reference symbol positions are variable with respect to the selected group of transmission symbol positions.

Another embodiment may have a data communication apparatus, for transmitting one or more blocks of data within a frame including a two-dimensional grid of transmission symbol positions, wherein the data communication apparatus is configured to select a group of transmission symbol positions, which is a subset of the two-dimensional grid of transmission symbol positions, for a transmission of a data portion; and wherein the data communication apparatus is configured to select a multiplexing characteristic of one or more reference symbols, which are associated to the selected group of transmission symbol positions, in dependence on the selection of the group of transmission symbol positions.

Another embodiment may have a data communication apparatus, for transmitting one or more blocks of data within a frame including a two-dimensional grid of transmission symbol positions, wherein the data communication apparatus is configured to select a group of transmission symbol positions, which is a subset of the two-dimensional grid of transmission symbol positions, for a transmission of a data portion; and wherein the data communication apparatus is configured to select a multiplexing characteristic of one or more reference symbols, which are associated to the selected group of transmission symbol positions, in dependence on a multiplexing group selection information defining a group of multiplexing characteristics, and in dependence on a multiplexing characteristic selection information defining which multiplexing characteristic out of a plurality of multiplexing characteristics contained in a group of multiplexing characteristics defined by the multiplexing group selection information should be used.

Another embodiment may have a data communication apparatus, for transmitting one or more blocks of data within a frame including a two-dimensional grid of transmission symbol positions, wherein the data communication apparatus is configured to select a group of transmission symbol positions, which is a subset of the two-dimensional grid of transmission symbol positions, for a transmission of a data portion; and wherein the data communication apparatus is configured to select a multiplexing characteristic of a plurality of reference symbols, which are associated to the selected group of transmission symbol positions, wherein the data communication apparatus is configured to select the multiplexing characteristic out of at least a first multiplexing pattern describing transmission symbol positions and a second multiplexing pattern describing transmission symbol positions, wherein the first multiplexing pattern includes at least one shared transmission symbol position, which is also used by the second multiplexing pattern, and at least one exclusive transmission symbol position which is not used by the second multiplexing pattern, and wherein the second multiplexing pattern includes the shared transmission symbol position and at least one exclusive transmission symbol position which is not used by the first multiplexing pattern.

Another embodiment may have a data communication apparatus for receiving a plurality of data blocks from other data communication apparatuses, wherein the data blocks are represented by transmission symbols of multiple groups of transmission symbol positions within a frame including a two-dimensional grid of transmission symbol positions, wherein the data communication apparatus is configured to signal to the other data communication apparatuses which group of transmission symbol positions should be used by which of the other data communication apparatuses, wherein the data communication apparatus is configured to provide an information describing a group of transmission symbol positions to be used by a given one of the other data communication apparatuses, and an information describing a desired relative position of reference symbol positions with respect to the group of transmission symbol positions to be used by the given one of the other data communication apparatuses.

Another embodiment may have a data communication apparatus for receiving a plurality of data blocks from other data communication apparatuses, wherein a data block is represented by transmission symbols of a group of transmission symbol positions within a frame including a two-dimensional grid of transmission symbol positions, wherein the data communication apparatus is configured to provide to the other data communication apparatuses a communication resource information, the communication resource information representing an allocation of transmission symbol positions and describing which group of transmission symbol positions should be used by which of the other data communication apparatuses and which of the transmission symbol positions should be used for a transmission of reference symbols by which of the other data communication apparatuses, wherein data communication apparatus is configured to signal different allocations of transmission symbol positions in dependence on a current communication state; wherein the transmission symbol positions to be used for the transmission of reference symbols are variable with respect to borders of time slots of the frame or with respect to borders of sub-frames of the frame between different allocations of transmission symbol positions or for a given allocation of transmission symbol positions, and/or wherein the transmission symbol positions to be used for the transmission of reference symbols are variable with respect a corresponding group of transmission symbol positions between different allocations of transmission symbol positions or for a given allocation of transmission symbol positions.

Another embodiment may have a data communication apparatus for receiving a plurality of data blocks from other data communication apparatuses, wherein a data block is represented by transmission symbols of a group of transmission symbol positions within a frame including a two-dimensional grid of transmission symbol positions, wherein the data communication apparatus is configured to provide to the other data communication apparatuses a communication resource information, the communication resource information representing an allocation of transmission symbol positions and describing which group of transmission symbol positions should be used by which of the other data communication apparatuses and which of the transmission symbol positions should be used for a transmission of reference symbols by which of the other data communication apparatuses, wherein the data communication apparatus is configured to provide the communication resource information to at least two other data communication apparatuses, to cause a sharing between the at least two other data communication apparatuses of a transmission symbol position for a transmission of a reference symbol.

According to another embodiment, a data communication system may have: a first inventive data communication apparatus; a second inventive data communication apparatus; a first other data communication apparatus linked with the first data communication apparatus; a second other data communication apparatus linked with the second data communication apparatus; wherein the first other data communication apparatus is configured to choose a multiplexing characteristic of one or more reference symbols, which are associated to a selected group of transmission symbol positions associated with the first other data communication apparatus, out of a plurality of multiplexing characteristics contained in a first group of multiplexing characteristics in dependence on a multiplexing characteristic selection information provided by the first data communication apparatus, and wherein the second other data communication apparatus is configured to choose a multiplexing characteristic of one or more reference symbols, which are associated to a selected group of transmission symbol positions associated with the second other data communication apparatus, out of a plurality of multiplexing characteristics contained in a second group of multiplexing characteristics in dependence on a multiplexing characteristic selection information provided by the second data communication apparatus.

According to another embodiment, a method for transmitting one or more blocks of data within a frame including a two-dimensional grid of transmission symbol positions may have the steps of: selecting a group of transmission symbol positions, which is a subset of the two-dimensional grid of transmission symbol positions, for a transmission of a data portion; and selecting one or more reference symbol positions associated to the selected group of transmission symbol positions, out of a plurality of possibilities, based on an information describing a desired relative position of the reference symbol positions with respect to the selected group of transmission symbol positions.

According to another embodiment, a method for transmitting one or more blocks of data within a frame including a two-dimensional grid of transmission symbol positions may have the steps of: selecting a group of transmission symbol positions, which is a subset of the two-dimensional grid of transmission symbol positions, for a transmission of a data portion, wherein one or more reference symbol positions are associated to the selected group of transmission symbol positions; and determining which one or more symbol positions are used as one or more reference symbol positions based on the selection of the group of transmission symbol positions or together with the selection of the group of transmission symbol positions; and wherein the reference symbol positions are variable with respect to borders of time slots of the frame or with respect to borders of sub-frames of the frame, or wherein the one or more reference symbol positions are variable with respect to the selected group of transmission symbol positions.

According to another embodiment, a method for transmitting one or more blocks of data within a frame including a two-dimensional grid of transmission symbol positions may have the steps of: selecting a group of transmission symbol positions, which is a subset of the two-dimensional grid of transmission symbol positions, for a transmission of a data portion; and selecting a multiplexing characteristic of one or more reference symbols, which are associated to the selected group of transmission symbol positions, in dependence on the selection of the group of transmission symbol positions.

According to another embodiment, a method transmitting one or more blocks of data within a frame including a two-dimensional grid of transmission symbol positions may have the steps of: selecting a group of transmission symbol positions, which is a subset of the two-dimensional grid of transmission symbol positions, for a transmission of a data portion; and selecting a multiplexing characteristic of one or more reference symbols, which are associated to the selected group of transmission symbol positions, in dependence on a multiplexing group selection information defining a group of multiplexing characteristics, and in dependence on a multiplexing characteristic selection information defining which multiplexing characteristic out of a plurality of multiplexing characteristics contained in a group of multiplexing characteristics defined by the multiplexing group selection information should be used.

According to another embodiment, a method for transmitting one or more blocks of data within a frame including a two-dimensional grid of transmission symbol positions may have the steps of: selecting a group of transmission symbol positions, which is a subset of the two-dimensional grid of transmission symbol positions, for a transmission of a data portion; and selecting a multiplexing characteristic of a plurality of reference symbols, which are associated to the selected group of transmission symbol positions, wherein the multiplexing characteristic is selected out of at least a first multiplexing pattern describing transmission symbol positions and a second multiplexing pattern describing transmission symbol positions, wherein the first multiplexing pattern includes at least one shared transmission symbol position, which is also used by the second multiplexing pattern, and at least one exclusive transmission symbol position which is not used by the second multiplexing pattern, and wherein the second multiplexing pattern includes the shared transmission symbol position and at least one exclusive transmission symbol position which is not used by the first multiplexing pattern.

According to another embodiment, a method receiving a plurality of data blocks from other data communication apparatuses at a data communication apparatus, wherein the data blocks are represented by transmission symbols of multiple groups of transmission symbol positions within a frame including a two-dimensional grid of transmission symbol positions, may have the steps of: signaling to the other data communication apparatuses which group of transmission symbol positions should be used by which of the other data communication apparatuses, providing an information describing a group of transmission symbol positions to be used by a given one of the other data communication apparatuses, and an information describing a desired relative position of reference symbol positions with respect to the group of transmission symbol positions to be used by the given one of the other data communication apparatuses.

According to another embodiment, a method for receiving a plurality of data blocks from other data communication apparatuses at a data communication apparatus, wherein a data block is represented by transmission symbols of a group of transmission symbol positions within a frame including a two-dimensional grid of transmission symbol positions, may have the steps of: providing to the other data communication apparatuses a communication resource information, the communication resource information representing an allocation of transmission symbol positions and describing which group of transmission symbol positions should be used by which of the other data communication apparatuses and which of the transmission symbol positions should be used for a transmission of reference symbols by which of the other data communication apparatuses, signaling different allocations of transmission symbol positions in dependence on a current communication state; wherein the transmission symbol positions to be used for the transmission of reference symbols are variable with respect to borders of time slots of the frame or with respect to borders of sub-frames of the frame between different allocations of transmission symbol positions, or wherein the transmission symbol positions to be used for the transmission of reference symbols are variable with respect a corresponding group of transmission symbol positions between different allocations of transmission symbol positions.

According to another embodiment, a method for receiving a plurality of data blocks from other data communication apparatuses at a data communication apparatus, wherein a data block is represented by transmission symbols of a group of transmission symbol positions within a frame including a two-dimensional grid of transmission symbol positions, may have the steps of: providing to the other data communication apparatuses a communication resource information, the communication resource information representing an allocation of transmission symbol positions and describing which group of transmission symbol positions should be used by which of the other data communication apparatuses and which of the transmission symbol positions should be used for a transmission of reference symbols by which of the other data communication apparatuses, providing the communication resource information to at least two other data communication apparatuses, to cause a sharing between the at least two other data communication apparatuses of a transmission symbol position for a transmission of a reference symbol.

According to another embodiment, a data communication method, for communicating between a first data communication apparatus and a first other data communication apparatus linked to the first data communication apparatus, and for communicating between a second data communication apparatus and a second other data communication apparatus linked to the second data communication apparatus, may have the steps of: at the first other data communication apparatus, choosing a multiplexing characteristic of one or more reference symbols, which are associated to a selected group of transmission symbol positions associated with the first other data communication apparatus, out of a plurality of multiplexing characteristics contained in a first group of multiplexing characteristics in dependence on a multiplexing characteristic selection information provided by the first data communication apparatus, and at the second other data communication apparatus, choosing a multiplexing characteristic of one or more reference symbols, which are associated to a selected group of transmission symbol positions associated with the second other data communication apparatus, out of a plurality of multiplexing characteristics contained in a second group of multiplexing characteristics in dependence on a multiplexing characteristic selection information provided by the second data communication apparatus, wherein multiplexing characteristics contained in different groups of multiplexing characteristics define orthogonal multiplexing codes or orthogonal multiplexing patterns.

According to another embodiment, a computer program for performing the inventive methods when the computer program runs on a computer.

An embodiment according to the invention creates a data communication apparatus for transmitting one or more blocks of data (for example, using one or more groups of transmission symbol positions, each transmission symbol position associated with one block of data) within a frame comprising a two-dimensional grid of transmission symbol positions. The data transmission apparatus is configured to select a group of transmission symbol positions (for example, OFDM symbols), which is a subset of the two-dimensional grid of transmission symbol positions, for a transmission of a data portion (or data block). The data communication apparatus is configured to select one or more reference symbol positions (for example, for reference OFDM symbols, i.e. OFDM symbols having a predetermined modulation content or a predetermined complex value and serving as a reference for a coherent reception of OFDM symbols encoding user data, application data or control data) associated to the selected group of transmission symbol positions, out of a plurality of possibilities, based on an information describing a desired relative position of the reference symbol positions with respect to (or within) the selected group of transmission symbol positions.

In other words, the data communication apparatus can, for example, select, where (at which transmission symbol position or positions) within a selected group of transmission symbol positions one or more reference symbols (for example, pilot-like symbols for estimating channel characteristics and for coherently detecting useful data at the side of another data communication apparatus) are inserted. The information describing a desired relative position of the reference symbol positions with respect to (or within) the selected group of transmission symbol positions may, for example, describe the (relative) position of the reference symbol positions with respect to (one or more) temporal borders or (one or more) frequency borders of the selected group of transmission symbol positions.

Thus, this embodiment according to the invention is based on the finding that a high degree of flexibility and an efficient signaling can be obtained by using an information describing a desired relative position of the reference symbol positions with respect to the selected group of transmission symbol positions. It has been found that such a relative position information is easy to encode and allows for an efficient placement of reference symbol positions within a transmission scheme which, for example, enables a reuse (sharing) of reference symbol positions by multiple data communication apparatuses. In particular, it has been found that the relative position of the reference symbol positions with respect to the selected group of transmission symbol positions varies between different application scenarios. For example, locating the reference symbol positions at a temporal beginning or at a temporal end of the selected group of transmission symbol positions allows for a sharing of said reference symbol positions by multiple data transmission apparatuses. On the other hand, a placement of the reference symbol positions approximately in the middle of the selected group of transmission symbol positions typically brings along an optimum result in the case that no sharing of reference symbol positions between different data transmission devices is desired or useful. On the other hand, it has been found that a signaling overhead, which would, for example, be caused by signaling reference symbol positions with respect to frame borders can be avoided, and that such "absolute" position information is also not required in many flexible resource allocation schemes.

To conclude, the above described concept allows for a highly efficient signaling of reference symbol positions even in the case of a flexible selection of transmission symbol positions with a fine granularity.

In an advantageous embodiment, the data communication apparatus is configured to receive an information indicating whether a reference symbol position is at a beginning (for example, a temporal beginning) of a selected group of transmission symbol positions, or at an end (for example, at a temporal end) of a selected group of transmission symbol positions.

In yet another advantageous embodiment, said information is a 1-bit information.

In another advantageous embodiment, the data communication apparatus is configured to receive an information indicating whether the reference symbol position is at the beginning of a selected group of transmission symbol positions (for example, only at the beginning), or at an end of a selected group of transmission symbol positions (for example, only at the end), or in an inner part of a selected group of transmission symbol positions (for example, with at least one non-reference-symbol position before and at least non-reference-symbol position after the reference symbol position) or whether there are reference symbol positions both at a beginning and at an end of a selected group of transmission symbol positions. These four choices are particularly well-adapted for a flexible decision about a sharing of reference symbols between different data communication apparatuses. If the reference symbol position is in an inner part of a selected group of transmission symbol positions, such that a symbol position of the selected group of transmission symbol positions which is associated to a useful data (e.g. application data or user data, rather than a fixed pilot symbol) is temporally before the reference symbol position and such that a symbol position (of the selected group of transmission symbol positions) associated with a transmission of useful data is behind the reference symbol position ensures that the reference symbol at the reference symbol position allows for a good channel estimation both for the useful data symbol before the reference symbol position and for the useful data symbol behind the reference symbol position. Moreover, arranging a reference symbol position at a beginning of the selected group of transmission symbol positions or at an end of the selected group of transmission symbol positions allows for sharing of a reference symbol position with another data communication apparatus. Furthermore, providing reference symbol positions both at the beginning and at the end of the selected group of transmission symbol positions allows for a sharing of reference symbol positions with two other data communication apparatuses.

In an advantageous embodiment, said information indicating the relative position of the reference symbol position is a 2-bit information.

In an advantageous embodiment, the communication apparatus is configured to selectively evaluate a 1-bit information describing a desired relative position of a (one or more) reference symbol positions with respect to the selected group of transmission symbol positions or a 2-bit information describing a desired relative position of a reference symbol position with respect to the selected group of transmission symbol positions in dependence on whether the selected group of transmission symbol positions comprises a length of two transmission symbol positions or a length of more than two transmission symbol positions (for example, in a temporal direction). Generally speaking, the decision whether a 1-bit information or a 2-bit information is used, can be made in dependence on a length of the selected group of transmission symbol positions.

Accordingly, a bitrate that may be used for the information describing the desired relative position of the reference symbol positions with respect to the selected group of transmission symbol positions can be adapted to the length (for example, to the temporal extension) of the selected group of transmission symbol positions. Thus, a bitrate can be kept reasonably small, and a transmission of meaningless information can be avoided.

Generally speaking, the data communication apparatus may be configured to selectively evaluate a 1-bit information describing a desired relative position of a reference symbol position with respect to the selected group of transmission symbol positions or a 2-bit information describing a desired relative position of a reference symbol position with respect to the selected group of transmission symbol positions in dependence on whether the selected group of transmission symbol positions comprises two transmission symbol positions or more than two transmission symbol positions in dependence on a temporal extension of a selected group of transmission symbol positions. For example, a 2-bit information may be used when a temporal extension of a selected group of transmission symbol position has a length which is at least equal to a predetermined or defined number of OFDM symbols (e.g. 4 OFDM symbols), and a 1-bit information may be used otherwise.

In a further embodiment, the data communication apparatus is configured to receive the information describing a desired relative position of the reference symbol position from another data communication device coordinating the operation of multiple data communication devices (for example, from a base station). Accordingly, the data communication apparatus can select the (relative) reference symbol position in accordance with a resource allocation controlled by another data communication device.

Another embodiment according to the invention creates a data communication apparatus for transmitting one or more blocks of data within a frame comprising a two-dimensional grid of transmission symbol positions. The data communication apparatus is configured to select a group of transmission symbol positions (for example, having a length of a so-called short transmission time interval sTTI), which is a subset of the two-dimensional grid of transmission symbol positions, for a transmission of a data portion (for example, a data block which comprises a common channel coding). One or more reference symbol positions (which may, for example, be used for the transmission of a so-called demodulation reference signal, DMRS) are associated to the selected group of transmission symbol positions. The data communication apparatus is configured to determine which one or more symbol positions (for example, within the selected group of transmission symbol positions) are used as one or more reference symbol positions based on the selection of the group of transmission symbol positions. The reference symbol positions may be variable with respect to borders of time slots of the frame or with respect to borders of sub-frames of the frames. Alternatively, or in addition, the one or more reference symbol positions may be variable with respect to the selected group of transmission symbol positions. In other words, the (relative) position (or location) of the reference symbol positions with respect to one or more borders of time slots of the frame or with respect to one or more borders of sub-frames of the frame may vary in dependence on where within a time slot or where within a sub-frame the selected group of transmission symbol positions lies. For example, the data communication apparatus may be configured such that a relative location of a reference symbol position with respect to a border of a time slot or with respect to a border of a sub-frame differs in dependence on where within the sub-frame the selected group of transmission symbol positions lies. For example, the data communication apparatus may be able to handle different scenarios like, for example, a first scenario in which the selected group of the transmission symbol positions is closer to a beginning of a time slot or a beginning of a sub-frame than in a second scenario, and also the second scenario. However, a relative position (for example, a temporal distance) between a reference symbol position associated with the selected group of transmission symbol positions in the first scenario may be different from a relative position or location (with respect to one or more borders of a time slot or with respect to one or more borders of a sub-frame) of a reference symbol position associated with the selected group of transmission symbol positions in the second scenario. Thus, the relative position of the reference symbol position(s) may vary between the different scenarios, which means that the reference symbol positions are no longer fixed with respect to one or more borders of a time slot (or of different time slots) or with respect to one or more borders of sub-frames. Consequently, a high degree of flexibility is gained when compared to a concept in which reference positions are fixed with respect to one or more borders of a time slot or with respect to one or more borders of a sub-frame. Consequently, a fine granularity for the selection of groups of transmission symbol positions is possible.

It should further be noted that it may also be possible that the relative positions of reference symbols (for example, relative one or more borders of a time slot and/or relative to one or more borders of a sub-frame) may be different for adjacent sub-carriers or at least for sub-carriers within a same physical resource block (PRB).

Moreover, the one or more reference symbol positions may be variable with respect to (for example, relative to) the selected group of transmission symbol positions (for example, even for selected groups of transmission symbol positions having identical temporal extensions or identical overall extensions, for example in a direction of time and in a direction of frequency). Accordingly, it is no longer necessary to have a fixed grid of reference symbol positions, which may be fixed with respect to borders of time slots of a frame or with respect to borders of sub-frames of a frame, or with respect to borders of selected groups of transmission symbol positions.

Thus, this embodiment according to the invention is based on the finding that the reference symbol positions, relative to borders of time slots or subframes of the frame, and/or relative to borders of the selected group of transmission symbol positions, should be variable and should depend on the selection of a group of transmission symbol positions. Accordingly, if a group of transmission symbol positions is selected having a certain extension (in time direction and/or in frequency direction), the actual reference symbol positions within the selected group of transmission symbol positions may vary depending on where (for example, measured relative to one or more borders of a time slot or relative to one or more borders of a sub-frame) the selected group of transmission symbol positions is arranged. Moreover, this concept allows for a fine granularity with respect to a positioning of selected groups of transmission symbol positions within a two-dimensional grid of symbol positions (for example, relative to borders of a time slot or with respect to borders of a sub-frame), wherein a small movement of a selected group of transmission symbol positions (for example, by one symbol position) may result in a corresponding movement of one or more reference symbol positions associated with said selected group of transmission symbol positions. Moreover, the concept allows to combine groups of transmission symbol positions associated to different data transmission apparatuses having different temporal extensions and/or frequency extensions within one time slot or sub-frame. Furthermore, obtaining flexibility with respect to a placement of reference symbol positions also allows to share reference symbol positions between different data communication apparatuses. This is due to the fact that the reference symbol positions within a selected group of transmission symbol positions having a certain temporal extension and/or frequency extension may vary depending on where within a two-dimensional grid of transmission symbol positions the selected group of transmission symbol positions is arranged, even for groups of transmission symbol positions having a same size (for example, a same extension in time direction and/or frequency direction).

In an advantageous embodiment, the location of the reference symbol positions with respect to (one or more) borders of time slots of the frame or with respect to (one or more) borders of sub-frames of the frame varies in dependence on an actual selection of a group of transmission symbol positions (for example, even for groups of transmission symbol positions having a same size).

In an advantageous embodiment, the data communication apparatus is configured to select, as one of multiple possible selection results, a case in which a reference symbol position is located at a beginning of a selected group of transmission symbol positions (for example, at the beginning of a selected group of transmission symbol positions having a given length or size).

Alternatively, or in addition, the data communication apparatus may be configured to select, as one of multiple possible selection results, a case in which a reference symbol position is located at an end of a selected group of transmission symbol positions (for example, for a selected group of transmission symbol positions having the given length or size).

Alternatively, or in addition, the data communication apparatus may be configured to select, as one of multiple possible selection results, a case in which a reference symbol position is located in an inner part of a selected group of transmission symbol positions (for example, for a selected group of transmission symbol positions having the given length or size).

Alternatively, or in addition, the data communication apparatus may be configured to select, as one of multiple possible selection results, a case in which a reference symbol position is located both at the beginning of a selected group of transmission symbol positions and at an end of the selected group of transmission symbol positions (for example, for a selected group of transmission symbol positions having the given length or size).

In other words, the apparatus may be able to select one or, typically, even two, three or four of the above mentioned locations for the reference symbol positions, even for groups of transmission symbol positions having the same size. For example, for selected groups of transmission symbol positions having temporal extensions of, say, four symbol positions, all four different locations (only at the beginning, only at the end, in the inner part, both at the beginning and at the end) for the reference symbol positions may be chosen, depending on where the selected group of transmission symbol positions is located within a slot or within a sub-frame, and/or in dependence on which groups of transmission symbol positions are adjacent to the selected group of transmission symbol positions. Thus, a high flexibility can be achieved and the available physical resources can be used in a very efficient manner by configuring the apparatus to be able to use two, three or four different (relative) positions within a selected group of transmission symbol positions for the reference symbol positions.

In an advantageous embodiment, the data communication apparatus may be configured to allow for a selection between groups of transmission symbol positions having different lengths. Also, the data communication apparatus may be configured to allow for a selection between groups of transmission symbol positions having the same length but different associated reference symbol positions (for example, relative to the selected group). For example, a first group of transmission symbol positions may comprise a length of four transmission symbol positions and may have a reference symbol position at a beginning, and another group of transmission symbol positions may also have a length of four transmission symbol positions but may have the associated reference symbol position at the end or in an inner part (for example at its second symbol position or at its third symbol position).

In an advantageous embodiment, the data communication apparatus may be configured to select a group of transmission symbol positions with a granularity which is smaller than a length of a sub-frame, or which is even smaller than a length of a slot.

In yet another advantageous embodiment, the data communication apparatus is configured to select a group of transmission symbol positions with a granularity of one transmission symbol position or with a granularity of two transmission symbol positions. Accordingly, it is possible to align the groups of transmission symbol positions in a very precise manner, thereby allowing for a good adaptation to the current requirements, for example, to the requirements of minimizing latency.

In an advantageous embodiment, the data communication apparatus is configured to select a group of transmission symbol positions with a granularity such that there are multiple different groups of transmission symbol positions selectable within a sub-frame. This also allows for a good adjustment to low latency requirements.

In an embodiment, a sub-frame is a shortest time unit within the two-dimensional grid of transmission symbol positions for which a transmission direction is freely selectable. Thus, even within such a short sub-frame, the radio resources can be allocated to multiple data communication apparatuses. Choosing the granularity for the selection of groups of transmission symbol positions to be smaller than the granularity for changing the transmission direction brings along the advantage that the physical channel resources are in use with high efficiency, since switching the direction of the communication typically involves larger time overhead than handing over the physical resources between different data communication apparatus transmitting the same direction. Accordingly, a fine granularity for the transmission of short data packets is obtained without wasting a large number of physical resources.

In an advantageous embodiment, the data communication apparatus is configured to vary a relative location of the one or more reference symbol positions in the grid of transmission symbol positions with reference to the selected group of transmission symbol positions in dependence on a temporal length of the selected group of transmission symbol positions (such that temporally short groups of transmission symbol positions have their reference symbol positions at a different place when compared to comparatively longer groups of transmission symbol positions), and/or in dependence on a temporal position of the selected group of transmission symbol positions (such that, for example, different selected groups of transmission symbol positions have their associated reference symbol positions at different locations even if the different selected groups of transmission symbol positions have the same temporal extension or the same size), and/or in dependence on a frequency position of the selected group of transmission symbol positions within a frame (such that, for example, a selected group of transmission symbol positions which is in a first frequency position has its associated reference symbol positions at a different location when compared to another same-length selected group of transmission symbol positions being in a different frequency position). Accordingly, one or more different criteria may be used to determine where (relative to the selected group of transmission symbol positions) the associated reference symbol positions should be (for example, even for selected groups of transmission symbol positions of a same length).

In an advantageous embodiment, the data communication apparatus may be configured to choose a symbol position at a temporal start of the selected group of transmission symbol positions or a symbol position at a temporal end of the selected group of transmission symbol positions as a reference symbol position. For example, the choice whether a symbol at a temporal start of the selected of transmission symbol positions or a symbol position at a temporal end of the selected group of transmission symbol positions is used as a reference symbol position may depend on where within the frame or sub-frame the selected group of transmission symbol positions is arranged (such that even selected groups of transmission symbol positions having the same length may have the associated reference symbol positions at different locations, for example relative to the respective selected group of transmission symbol positions).

In an advantageous embodiment, the data communication apparatus may be configured to choose a symbol position, at which the selected group of transmission symbol positions neighbors or overlaps another group of transmission symbol positions, which is associated with another data communication apparatus, within a same sub-frame, as a reference symbol position. In other words, a decision, were within a selected group of transmission symbol positions the (one or more) reference symbol positions should be located is made such that the reference symbol position is at a location where the selected group of transmission symbol position neighbors another group of transmission symbol positions (associated to another data communication apparatus) which another group of transmission symbol positions lies within the same sub-frame as the selected group of transmission symbol positions. Accordingly, the reference symbol position associated with the selected group of transmission symbol positions can be shared with another group of transmission symbol positions within the same sub-frame. For example, if the selected group of transmission symbol positions is located right at the beginning of the sub-frame, the reference symbol position is chosen at the end of the selected group of transmission symbol positions. In contrast, if a selected group of transmission symbol positions of the same length is located right at the end of a sub-frame, the reference symbol position will be chosen at the beginning of said selected group of transmission symbol positions. Generally speaking, the reference symbol positions will be selected by the data communication apparatus such that they are not arranged at the very beginning of a sub-frame or at the very end of a sub-frame, but at an "inner" end (pointing to the inside of a sub-frame) of the respective selected group of transmission symbol positions. This also applies to different selected groups of transmission symbol positions of same length. Thus, a sharing of reference symbol positions by different data communication apparatuses is supported.

In an advantageous embodiment, the data communication apparatus is configured to choose a number of reference symbol positions associated with the selected group of transmission symbol positions in dependence on a location of the selected group of transmission symbol positions within a sub-frame. Thus, for groups of transmission symbol positions of a same length, the number of associated reference symbol positions may vary depending on where the respective groups of transmission symbol positions are arranged within a sub-frame. This allows to adapt the number of reference symbol positions to find a good tradeoff between resource efficiency and communication quality.

In an advantageous embodiment, the data communication apparatus may be configured to choose a number of reference symbol positions associated with the selected group of transmission symbol positions in dependence on, a number of neighboring groups of transmission symbol positions within the sub-frame. For example, a larger number of reference symbol positions may be associated with groups of transmission symbol positions having more neighbors than with other groups of transmission symbol positions having less neighbors.

In an embodiment, the data communication apparatus may be configured to choose a number of reference symbol positions associated with the selected group of transmission symbol positions. In this case, only one reference symbol position may be associated with selectable groups of transmission symbol positions neighboring a temporal border of a sub-frame, and two or more reference symbol positions may be associated with at least one selectable group of transmission symbol positions which is (are) distant from both temporal borders of the sub-frame. Thus, it is avoided that a reference symbol position is arranged next to a border of a sub-frame, because such a reference symbol position typically contributes less to a channel estimation than a reference symbol position arranged within an inside of a sub-frame, and typically cannot be reused by a sharing with another data communication apparatus.

In an advantageous embodiment, the data communication apparatus is configured to select a group of transmission symbol positions such that a temporal extension of the selected group of transmission symbol positions is smaller than a temporal extension of a sub-frame.

Another embodiment according to the invention creates a data communication apparatus for transmitting one or more blocks of data within a frame comprising a two-dimensional grid of transmission symbol positions. The data communication apparatus is configured to select a group of transmissions symbol positions, which is a subset of the two-dimensional grid of transmission symbol positions, for a transmission of a data portion. The data communication apparatus is configured to select a multiplexing characteristic of one or more reference symbols, which are associated to the selected group of transmission symbol positions, in dependence on the selection of the group of transmission symbol positions. The multiplexing characteristic may, for example, describe one out of a plurality of orthogonal, or approximately orthogonal frequency multiplexing patterns or code multiplexing patterns, such that reference symbols transmitted, for example, at the same time by different data communication apparatuses can be separated by a "central" data communication apparatuses receiving both transmissions. However, a data communication apparatus may, for example, recognize, on the basis of the selected group of transmission symbol positions, whether there is a sharing of a reference symbol position. Also, the data communication apparatus may, for example, recognize whether there is another data communication apparatus transmitting temporally before its own transmission. In this case, a specific multiplexing characteristic may be chosen. On the other hand, if the data communication apparatus recognizes that it is sharing a reference symbol position with another data communication apparatus, which transmits data later then itself, the data communication apparatus under consideration may use another multiplexing characteristic. As an example, the data communication apparatus may choose a first multiplexing characteristic if the selected group of transmission symbol positions is closer to a beginning of a sub-frame when compared to a case that the selected group of transmission symbol positions is further away from the beginning of the sub-frame. Consequently, it may be unnecessary to have a dedicated signaling which multiplexing characteristic should be used for the reference symbols.

Another embodiment according to the invention creates a data communication apparatus for transmitting one or more blocks of data within a frame comprising a two-dimensional grid of transmission symbol positions. The data communication apparatus is configured to select a group of transmission symbol position positions, which is a subset of the two-dimensional grid of transmission symbol positions, for a transmission of a data portion. The data communication apparatus is configured to select a multiplexing characteristic of one or more reference symbols, which are associated with the selected group of transmission symbol positions, in dependence on a multiplexing group selection information defining a group of multiplexing characteristics, and in dependence on a (individual) multiplexing characteristic selection information defining which multiplexing characteristic out of a plurality of multiplexing characteristics contained in a group of multiplexing characteristics defined by the multiplexing group selection information should be used. In other words, the data communication apparatus may use a two-stage selection of a multiplexing characteristic. Thus, a group of multiple different multiplexing characteristics may be determined by the multiplexing group selection information. Later on, the actual multiplexing characteristic may be selected out of the previously selected group of multiplexing characteristics, to obtain the multiplexing characteristic to be actually used. Thus, since the selection of the group of multiplexing characteristics may typically be used only rarely, the amount of information (in terms of bits) that may be used for signaling the multiplexing characteristic may be reduced (when compared to a full signaling of the multiplexing characteristic every time the multiplexing characteristic should be changed. In other words, it is, for example, possible to associate different groups of multiplexing characteristics to temporally neighboring data communication apparatuses, to thereby reduce a mutual distortion of the data communication apparatuses.

In an advantageous embodiment, the data communication apparatus is configured to derive the multiplexing group selection information from a cell identifier of a communication cell in which the data communication apparatus is registered. Accordingly, an overhead for the transmission of the multiplexing group selection information is avoided. Rather, the data communication apparatus can, by itself, derive the multiplexing group selection information from the cell identifier of the communication cell.

In an advantageous embodiment, the multiplexing characteristics contained in different groups of multiplexing characteristics define orthogonal multiplexing codes or orthogonal multiplexing patterns (or at least approximately orthogonal multiplexing codes or multiplexing patterns, or at least multiplexing patterns or multiplexing codes which are distinguishable at the side of a central data communication apparatus). By using such a concept, a mutual distortion between other communication apparatuses using different groups of multiplexing characteristics can be minimized.

In an advantageous embodiment, the data communication apparatus is configured to update or receive the multiplexing characteristic selection information more frequently than the multiplexing group selection information. Accordingly, data overhead can be minimized. Furthermore, the multiplexing group selection only needs the change rarely, for example, when a data communication apparatus is handed over to a new communication cell.

An embodiment according to the invention creates a data communication apparatus for transmitting one or more blocks of data within a frame comprising a two-dimensional grid of transmission symbol positions. The data communication apparatus is configured to select a group of transmission symbol positions, which is a subset of the two-dimensional grid of transmission symbol positions, for a transmission of a data portion. The data communication apparatus is configured to select a multiplexing characteristic of a plurality of reference symbols, which are associated with the selected group of transmission symbol positions. The data communication apparatus is configured to select the multiplexing characteristic out of this first multiplexing pattern describing transmission symbol positions and a second multiplexing pattern describing transmission symbol positions at which reference symbols are to be transmitted. The first multiplexing pattern comprises at least one shared transmission symbol position, which is also used by the second multiplexing pattern, and at least one exclusive transmission symbol position which is not used by the second multiplexing pattern. The second multiplexing pattern comprises the shared transmission symbol position and at least one exclusive transmission symbol position which is not used by the first multiplexing pattern. Accordingly, by having both shared transmission symbol positions and exclusive transmission symbol positions associated with the first and second multiplexing pattern, an efficiency can be improved. For example, transmission symbol positions which are of particular importance for an interpolation or extrapolation can be shared. On the other hand, there are also exclusive transmission symbol positions, which help to increase an accuracy of the channel estimation by the reference symbols transmitted using the multiplexing characteristics.

In an advantageous embodiment, the first multiplexing pattern comprises an alternating sequence of used exclusive transmission symbol positions and one or more non-used transmission symbol positions in between. Moreover, the second multiplexing pattern also comprises an alternating sequence of used exclusive transmission symbol positions (used by the second multiplexing pattern but not used by the first multiplexing pattern) and one or more non-used transmission symbol positions (not used by the second multiplexing pattern, but maybe used by the first multiplexing pattern) in between. Moreover, a highest-frequency transmission symbol position and/or a lowest frequency transmission symbol position are shared between the first multiplexing pattern and the second multiplexing pattern. It has been found that the sharing of the highest-frequency transmission symbol position and/or of the lowest frequency transmission symbol position is helpful, because it is difficult to estimate the channel characteristic at the highest frequency or at the lowest frequency.

An embodiment according to the invention creates a data communication apparatus for receiving a plurality of data blocks from other data communication apparatuses, wherein the data blocks are represented by transmission symbols of multiple groups of transmission symbol positions within a frame comprising a two-dimensional grid of transmission symbol positions. The data communication apparatus is configured to signal to the other data communication apparatuses which group of transmission symbol position should be used by which of the other data communication apparatuses. For example, individual resource allocation information may be provided to different data communication apparatuses. Alternatively, an overall resource allocation scheme may be signaled to all data communication apparatuses (defining an overall resource allocation) wherein it is only signaled to the individual data communication apparatuses which of the resources defined by the overall resource allocation scheme are allocated to which of the data communication apparatuses. As an alternative example, the data communication apparatus may provide each of the other data communication apparatuses with very detailed information describing the resources allocated to the individual data communication apparatus. Thus, the data communication apparatus is configured to provide an information describing a group of transmission symbol positions to be used by a given one of the other data communication apparatuses and an information describing a desired relative position of reference symbol positions with respect to the group of transmission symbol positions to be used by the given one of the other data communication apparatuses. In other words, the data communication apparatus may define, in detail, where within a selected group of reference symbol positions the reference symbol positions should be located. This information may, for example, selectably describe "at the beginning of the selected group of transmission symbol positions", "at the end of the selected group of transmission symbol positions", "in an inner part of the selected group of transmission symbol positions" or "both at the beginning and at the end of the selected group of transmission symbol positions". This embodiment according to the invention is based on the same considerations mentioned above with respect to a data communication apparatus for transmitting a plurality of data blocks. Moreover, this data communication apparatus for receiving a plurality of data blocks from other data communication apparatuses may be supplemented by features which correspond to the features mentioned above for the corresponding data communication apparatuses for transmitting a plurality of data blocks. For example, the information describing a desired relative position of reference symbol positions with respect to the selected group of transmission symbol positions may be a 1-bit information or a 2-bit information.

Moreover, the information describing a desired relative position of reference symbol positions with respect to a group of transmission symbol positions to be used by a given one of the other data communication apparatuses may be a 1-bit information for a comparatively "short" group of transmission symbol positions, and may be a 2-bit information for a comparatively "longer" group of transmission symbol positions.

Another embodiment according to the invention creates a data communication apparatus for receiving a plurality of data blocks from other communication apparatuses, wherein a data block is represented by transmission symbols of a group of transmission symbol positions within a frame comprising a two-dimensional grid of transmission symbol positions. The data communication apparatus is configured to provide to the other data communication apparatuses a communication resource information. The communication resource information represents an allocation of transmission symbol positions and describes which group of transmission symbol positions should be used by which of the other data communication apparatuses and which of the transmission symbol positions should be used for a transmission of reference symbols by which of the other data communication apparatuses. The data communication apparatus is configured to signal different allocations of transmission symbol positions in dependence on a current communication state (for example, in dependence on how many other data communication apparatuses are connected to the data communication apparatus discussed here, and/or in dependence on latency requirements of one or more data communication apparatuses connected to the data communication apparatus discussed here). The transmission symbol positions to be used for the transmission of reference symbols are variable with respect to borders of time slots of the frames and/or with respect to borders of sub-frames of the frame between different allocations of transmission symbol positions (or even within a single allocation of transmission symbol positions). Alternatively or in addition, the transmission symbol positions to be used for the transmission of reference symbols may be variable with respect to a corresponding group of transmission symbol positions between different allocations of transmission symbol positions (or even within a single allocation of transmission symbol positions). For example, when there is a reallocation of transmission symbol positions, the location of reference symbols may vary, both with respect to borders of time slots or of respect to borders of sub-frames. Also, when the transmission symbol positions are reallocated (for example, due to our change of the current communication state), the locations of the reference symbols with respect to a corresponding group of transmission symbol positions (for example, with respect to one or more borders of a group of transmission symbol positions to which the reference symbol is associated) may change. Thus, the locations of the reference symbol positions are not fixed with respect to borders of time slots and/or with respect to borders of sub-frames. Also, the position within groups of transmission symbol positions (which are allocated to a given data communication device) may vary, even if the temporal length or size of a group (for example, of a contiguous group) of transmission symbol positions associated to a data communication apparatus does not change. However, even at a single instance of time, relative positions of reference symbol positions may vary between groups of transmission symbol positions allocated to different data communication apparatuses.

In other words, the data communication apparatus for receiving a plurality of data blocks is based on the same considerations as the above-mentioned data communication apparatus for transmitting a plurality of data blocks. Thus, any of the considerations provided herein with respect to the data communication apparatus for transmitting a plurality of data blocks also apply to the data communication apparatus for receiving a plurality of data blocks. However, the data communication apparatus for receiving a plurality of data blocks may be a base station or a central station coordinating the operation of a plurality of data communication apparatuses for transmitting a plurality of data blocks, and may signal to other data communication apparatuses (for example, to data communication apparatuses for transmitting a plurality of data blocks) a location of transmission symbol positions. In contrast, the data communication apparatuses for transmitting a plurality of data blocks may, for example, be user equipment, and may allocate the resources as signaled from the coordinating "data communication apparatus for receiving a plurality of data blocks".

However, it should be noted that the "data communication apparatus for receiving a plurality of data blocks" may also have the functionality to transmit a plurality of data blocks. Similarly, the "data communication apparatuses for transmitting a plurality of data blocks" may also have a receiving functionality, which, however, is of subordinate importance in the data communication scenario discussed here.

The data communication apparatus discussed here may switch between a number of different communication states (and may, for example, provide information indicating the different communication states to the other data communication devices). The different communication states may signal to one or more other data communication apparatuses different communication resource information, which indicates different reference symbol positions. Thus, the data communication apparatus discussed here may instruct the one or more other data communication apparatuses to use different reference symbol positions for the transmission of reference symbols. For example, different reference symbol positions may be instructed even for groups of transmission symbol positions having the same length. Thus, the data communication apparatus described herein has the functionality to flexibly configure the other data communication apparatuses. In particular, the data communication apparatus discussed here typically has superior knowledge about the presence of multiple other data communication apparatuses within a communication cell, and can therefore instruct the different other data communication apparatuses to use different reference symbol positions (in some cases, even shared reference symbol positions) on the basis of its superior knowledge. The reference symbol positions are not fixed by the length (or size) of the groups of transmission symbol positions to be used by the individual other data communication apparatuses, but rather can be allocated flexibly by the data communication apparatus described here, wherein, even for a given length or size of a group of transmission symbol positions to be used by one of the other data communication apparatuses, the reference symbol position can be varied by the data communication apparatus discussed here.

In an advantageous embodiment, the data communication apparatus is configured to allow for an allocation of groups of transmission symbol positions having different lengths. Moreover, the data communication apparatus is configured to allow for an allocation of groups of transmission symbols having the same length but different associated reference symbol positions during a single communication state and/or during different communication states. For example, the data communication apparatus described herein may signal that a first group of transmission symbol positions having a certain temporal extension should have the reference symbol position at the end, wherein another group of transmission symbol positions having the same length may have the reference symbol position at the very beginning.

Consequently, reference symbol positions may be varied and are not bound in a fixed manner by the temporal extension or size of the respective groups of transmission symbol positions.

Again, it should be noted that the data communication apparatus for receiving a plurality of data blocks corresponds to the above described data communication apparatus for transmitting a plurality of data blocks, such that the above explanations and clarifications also are applicable.

Another advantageous embodiment creates a data communication apparatus for receiving a plurality of data blocks from other data communication apparatuses, wherein a data block is represented by transmission symbols of a group of transmission symbol positions within a frame comprising a two-dimensional grid of transmission symbol positions. The data communication apparatus is configured to provide to the other data communication apparatuses a communication resource information. The communication resource information represents an allocation of transmission symbol transmissions and describes which group of transmission symbol positions should be used by which of the other data communication apparatuses and which of the transmission symbol position should be used for a transmission of reference symbols by which of the other data communication apparatuses. The communication resource information may represent any details of the resource allocation individually for different of the other data communication apparatuses. However, it is also possible that a "overall" resource allocation scheme (out of a plurality of overall source allocation schemes) is signaled commonly to all other data communication apparatuses, and that there is only a short information which of the groups of transmission symbol positions (defined by the overall resource allocation scheme) is allocated to which of the other data communication apparatuses. The data communication apparatus is configured to provide the communication resource information to at least two other data communication apparatuses, to cause a sharing between at least two other data communication apparatuses of a transmission symbol position for a transmission of a reference symbol. In other words, the data communication apparatus provides configuration information (communication resource information) to at least two other data communication apparatuses, wherein the data communication apparatus chooses or adjusts the communication resource information in such a manner that at least two other data communication apparatuses share a transmission symbol position for a transmission of a reference symbol. Worded yet differently, the data communication apparatus configures (using the communication resource information) two other data communication apparatuses, such that both transmit a reference symbol within a shared transmission symbol position. However, the reference symbol transmissions by both of the other data communication apparatuses may be distinguishable if the at least two other data communication apparatuses use different codes or patterns or the like for the transmission of their reference symbols at the shared transmission symbol position (or at a plurality of shared transmission symbol positions). Thus, the data communication apparatus can configure the at least two other data communication apparatuses for an efficient resource usage, thereby saving physical resources and ensuring that an overhead caused by reference symbols due to the usage of "short transmission time intervals" (i.e. temporally short groups of transmission symbol positions) is kept reasonably small.

In an advantageous embodiment, the data communication apparatus is configured to provide the communication resource information to at least two other data communication apparatuses, to cause a first data communication apparatus to which a comparatively shorter transmission length is associated, to share transmission symbol positions for a transmission of reference symbols with only one other data communication device, and to cause a second data communication apparatus, to which a comparatively longer transmission length is associated to share transmission symbol positions for transmission of reference symbols with two or more other data communication devices. Accordingly, an efficiency of the transmission can be optimized.

In an advantageous embodiment, the data communication apparatus is configured to cause a second (other) data communication apparatus to share one or more transmission symbol positions at the beginning of a group of transmission symbol positions associated with the second (other) data communication apparatus, with a first (other) data communication apparatus for transmission of one or more reference symbols. Furthermore, the data communication apparatus is configured to cause the second data communication apparatus to share one or more transmission symbol positions at an end of a group of transmission symbol positions associated with a second data communication apparatus with a third data communication apparatus for the transmission of one or more reference symbols. Accordingly, there is an efficient resource sharing approach.

In an advantageous embodiment, the data communication apparatus is configured to decide whether a given other data communication apparatus is instructed to share transmission symbol positions with one or more other data communication apparatuses for the transmission of one or more reference symbols in dependence on a length of a transmission interval associated with the given data transmission apparatus, and/or in dependence on a channel condition and/or in dependence on a signal-to-noise ratio. Accordingly, the resource sharing approach is adapted to external conditions which determine the efficiency of a resource sharing.

In an advantageous embodiment, the communication resource information defines an allocation of transmission symbol positions to the other data communication apparatuses using device-specific information items. Alternatively, the communication resource information comprises a joint information item describing a selection of a joint allocation of transmission symbol positions to a plurality of other data transmission apparatuses out of a plurality of predefined joint allocations of transmission symbol positions.

In an advantageous embodiment, the data communication apparatus is configured to provide a multiplexing characteristic selection information defining which multiplexing characteristic out of a plurality of multiplexing characteristics defined in a group of multiplexing characteristics should be used by at least one other data communication apparatus. Accordingly, the data communication apparatus can ensure that there is a well-controlled multiplexing of reference symbols which are transmitted at shared reference symbol positions by multiple data communication devices.

In an advantageous embodiment, the data communication apparatus is configured to provide a multiplexing characteristic selection information instructing another data communication apparatus in communication with the data communication apparatus described here to select a multiplexing characteristic out of at least the first multiplexing pattern describing transmission symbol positions and a second multiplexing pattern describing transmission symbol positions, wherein the first multiplexing pattern comprises at least one shared transmission symbol position, which is also used by the second multiplexing pattern, and at least one exclusive transmission symbol position which is not used by the second multiplexing pattern, and wherein the second multiplexing pattern comprises the shared transmission symbol position and at least one exclusive transmission symbol position which is not used by the first multiplexing pattern. Accordingly, the data communication apparatus can efficiently configure the multiplexing, to minimize distortions and/or to allow for good channel estimation using the reference symbols.

In yet another advantageous embodiment, the data communication apparatus can signal a switching between a first multiplexing pattern and a second multiplexing pattern as already outlined above.

An embodiment according to the invention creates a data communication system. The data communication system comprises a first a data communication apparatus as described above (for example, a data communication apparatus for receiving one or more data blocks, or a first base station). The data communication system further comprises a second data communication apparatus as described herein (for example, another data communication apparatus for receiving data blocks or a second base station). The data communication system also comprises a first other data communication apparatus (as described herein, for example, a data communication apparatus for transmitting one or more data block, or a first user equipment), linked to the first data communication apparatus. The data communication system further comprises a second other data communication apparatus (for example, another data communication apparatus for transmitting one or more data blocks, or a second user equipment), linked to the second data communication apparatus. The first other data communication apparatus is configured to choose a multiplexing characteristic of one or more reference symbols, which are associated to a respective group of transmission symbol positions associated with the first other data communication apparatus, out of a plurality of multiplexing characteristics contained in a first group of multiplexing characteristics in dependence on a multiplexing characteristic selection information provided by the first data communication apparatus. The second other data communication apparatus is configured to choose a multiplexing characteristic of one or more reference symbols, which are associated to a selected group of transmission symbol positions associated with the second other data communication apparatus, out of a plurality of multiplexing characteristics contained in a second group of multiplexing characteristics, depending on a multiplexing characteristic selection information provided by the second data communication apparatus. Multiplexing characteristics contained in different groups of multiplexing characteristics define orthogonal or approximately orthogonal multiplexing codes or orthogonal or approximately orthogonal multiplexing patterns (which are defined to minimize or avoid a distortion). Thus, the first other data communication apparatus and the second other data communication apparatus can share a transmission symbol position (for example, the intersection of the selected group of transmission symbol positions associated to the first other data communication apparatus and of the selected group of transmission symbol positions associated to the second other data communication apparatus). For each transmission of reference symbols, a multiplexing characteristic of the first group of multiplexing characteristics is used by the first other data communication apparatus, and a multiplexing characteristic out of the second group of multiplexing characteristics is used by the second other data communication apparatus. Thus, by using different groups of multiplexing characteristics, it can be automatically ensured that there is little or no distortion between the reference symbol transmitted by the first other data communication apparatus and the reference symbol transmitted by the second other data communication apparatus in the shared transmission symbol position. Furthermore, by using different groups of multiplexing characteristics, a signaling overhead for the controlling or coordinating the first other data communication apparatus and the second other data communication apparatus can be kept reasonably small.

In an advantageous embodiment, the first other data communication apparatus is configured to derive a multiplexing group selection information, which is used to select the first group of multiplexing characteristics from a cell identifier of the first data communication apparatus. Similarly, the second other data communication apparatus may, optionally, also have such an ability. Accordingly, there is an "automatic" selection of different groups of multiplexing characteristics by the different data communication apparatuses, which does not even need any signaling overhead. Thus, it can be ensured, without a signaling overhead, that there is no or little distortion caused by the transmission of reference symbols at the shared transmission symbol position.

One embodiment according to the invention comprises respective methods. It should be noted that the methods are based on the same considerations as the above described apparatuses. Furthermore, it should be noted that the methods can be supplemented by any of the features and functionalities disclosed herein with respect to the apparatuses.

Further embodiments according to the invention create a computer program for performing one of said methods.

BRIEF DESCRIPTION OF THE DRAWINGS

Embodiments of the present invention will be detailed subsequently referring to the appended drawings, in which:

FIG. 13 shows a table representing a DCI message with added 1-bit DCI position field;

FIG. 14 shows a table representing a DCI message with added 1-bit or 2-bit DCI position field;

FIG. 15 shows a table representing a grouping of DMRS multiplexing patterns;

FIG. 16 shows a list of acronyms and symbols;

FIG. 21 shows a flowchart of a method for transmitting one or more blocks of data, according to an embodiment of the present invention;

FIG. 22 shows a flowchart of a method for transmitting one or more blocks of data, according to an embodiment of the present invention;

FIG. 23 shows a flowchart of a method for transmitting one or more blocks of data, according to an embodiment of the present invention;

FIG. 24 shows a flowchart of a method for transmitting one or more blocks of data, according to an embodiment of the present invention;

FIG. 25 shows a flowchart of a method for transmitting one or more blocks of data, according to an embodiment of the present invention;

FIG. 26 shows a flowchart of a method for receiving one or more blocks of data, according to an embodiment of the present invention;

FIG. 27 shows a flowchart of a method for receiving one or more blocks of data, according to an embodiment of the present invention; and FIG. 28 shows a flowchart of a method for receiving one or more blocks of data, according to an embodiment of the present invention.

DETAILED DESCRIPTION OF THE INVENTION

1. Data Communication Apparatus According to FIG. 17

Figure 17:
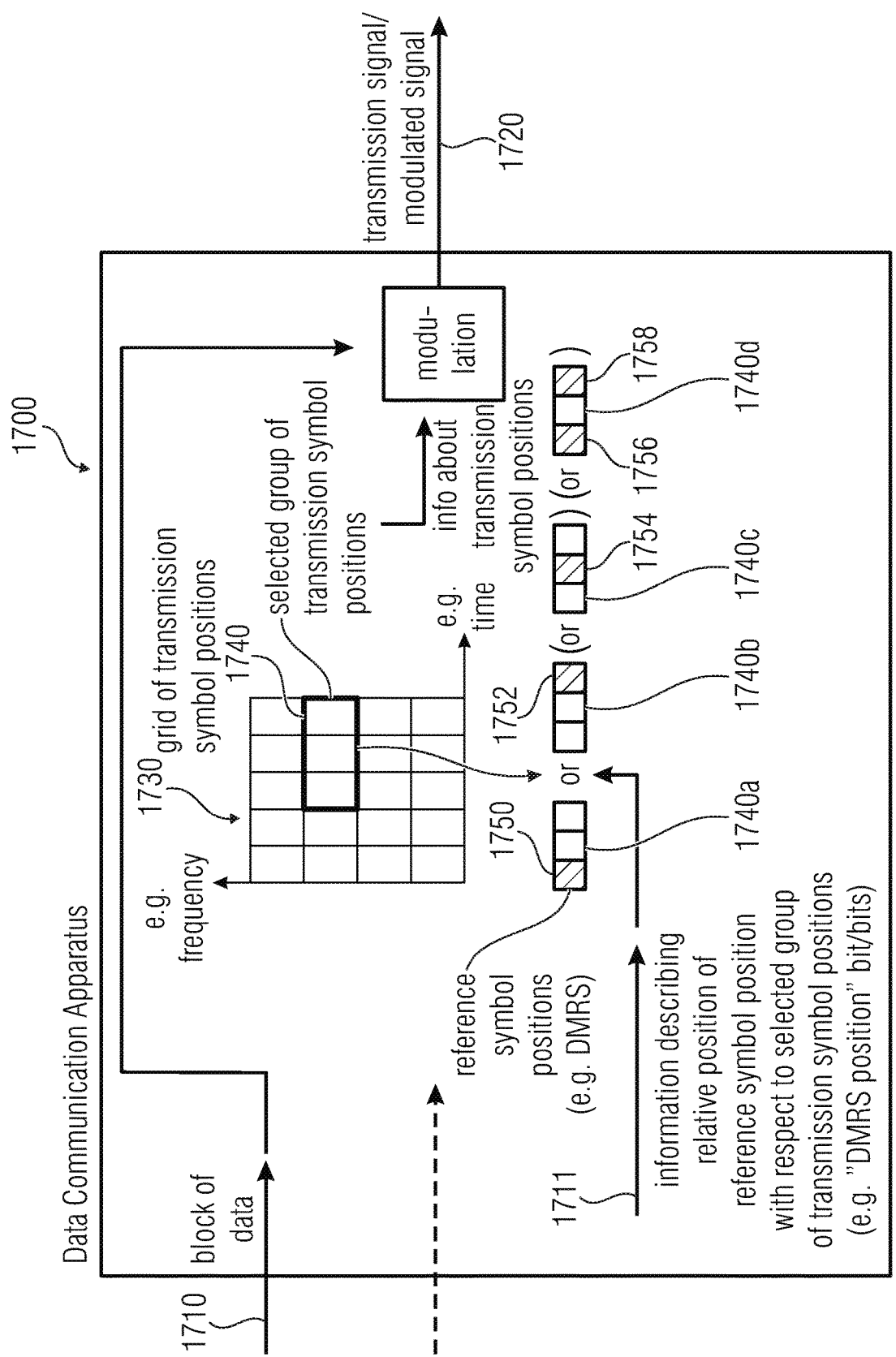
FIG. 17 shows a block schematic diagram of a data communication apparatus, according to an embodiment of the present invention.

FIG. 17 shows a block schematic diagram of a data communication apparatus 1700, according to an embodiment of the present invention.

The data communication apparatus 1700 receives one or more blocks of data 1710 and provides, on the basis thereof, a transmission signal or modulation signal 1720. The data communication apparatus is configured to transmit the one or more blocks of data within a frame comprising a two-dimensional grid of transmission symbol positions, as illustrated at reference numeral 1730.

The data communication apparatus 1700 is configured to select a group of transmission symbol positions 1740 (a length of which may be a so-called "short transmission time interval" sTTI), which is a subset of the two-dimensional grid of transmission symbol positions (shown at reference numeral 1730), for transmission of a data portion (for example, a block of data). The data communication apparatus is configured to select one or more reference symbol positions 1750, 1752, 1754 associated to the selected group of transmission symbol positions (for example, lying within the selected group 1740 of transmission symbol positions), out of a plurality of possibilities, based on an information describing a desired relative position of the reference symbol position with respect to (or with reference to, or relative to) the selected group of transmission symbol positions.

An example is illustrated in FIG. 17. For example, if the selected group 1740 of transmission symbol positions comprises a given number of transmission symbol positions (for example, three transmission symbol positions), there are, for example, (at least) four possibilities for the allocation of reference symbol positions, wherein the data communication apparatus 1700 may make a choice between at least two of these possibilities, or even between all four of these possibilities. For example, the data communication apparatus may be configured to select one or more reference symbol positions (for example, the reference symbol position 1750 at the beginning of the selected group of transmission symbol positions (as shown at reference numeral 1740a), the reference symbol position 1752 at the end of the selected group of transmission symbol positions, as shown at reference numeral 1740b, the reference symbol position 1754 in an inner (or at the middle) of the selected group of transmission symbol positions, as shown at reference numeral 1740c, or two reference symbol positions 1756, 1758, both at the beginning at the end of the selected group of transmission symbol positions, as shown at reference numeral 1740d). In other words, the data communication apparatus may be configured to variably select one or more reference symbol positions within the selected group of transmission symbol positions, wherein the data communication apparatus may use an information describing a relative position of the reference symbol position(s) with respect to the selected group of transmission symbol positions. This information describing the relative positions may, for example, represent two or more of the relative positions "at the beginning", "at the end", "in an inner part", "in the middle", "both at the beginning and at the end". Thus, the reference symbol position can be encoded efficiently and selected by the data communication apparatus 1700.

Moreover, it should be noted that the data communication apparatus 1700 uses the selected group of transmission symbol positions in order to obtain a transmission signal or a modulated signal 1720. In particular, a data block to be transmitted may be provided with a channel coding (which, for example, allows for a detection and/or correction of transmission errors), and the resulting channel-coded data may then be represented in the form of modulation symbols (e.g. complex-valued OFDM modulation symbols) which are included in a transmission signal, or into a modulation signal, at transmission symbol positions within the selected group of transmission symbol positions. In this case, the reference symbol position, which typically lies within the selected group of transmission symbol positions, is occupied with a modulation symbol, which is independent from a data content of the block of data to be transmitted, to be used (or usable) for a channel estimation. In other words, the useful data of the block of data to be transmitted are reflected by modulation symbols placed at non-reference-symbol positions within the selected group of transmission symbol positions.

Thus, the data communication apparatus 1700 has a flexible scheme of selecting a group of transmission symbol positions for the transmission of a data block, and also has a flexible concept for selecting which symbol position (or which symbol positions) within the selected group of transmission symbol positions should be used for the transmission of one or more reference symbols. By flexibly assigning the reference symbol positions at different (relative) locations within the selected group of transmission symbol positions, it is possible to adapt the data communication to different scenarios, for example to scenarios in which a sharing of reference symbol positions between different data communication apparatuses is desired and to scenarios in which there is no sharing of reference symbol positions between data communication apparatuses.

Further details regarding the data communication apparatus 1700, and regarding the allocation of groups of transmission symbol positions will be described below.

In other words, the apparatus 1700 according to FIG. 17 can be supplemented by any of the features and functionalities described herein, either individually or in combination.

2. Data Communication Apparatus According to FIG. 18

Figure 18:
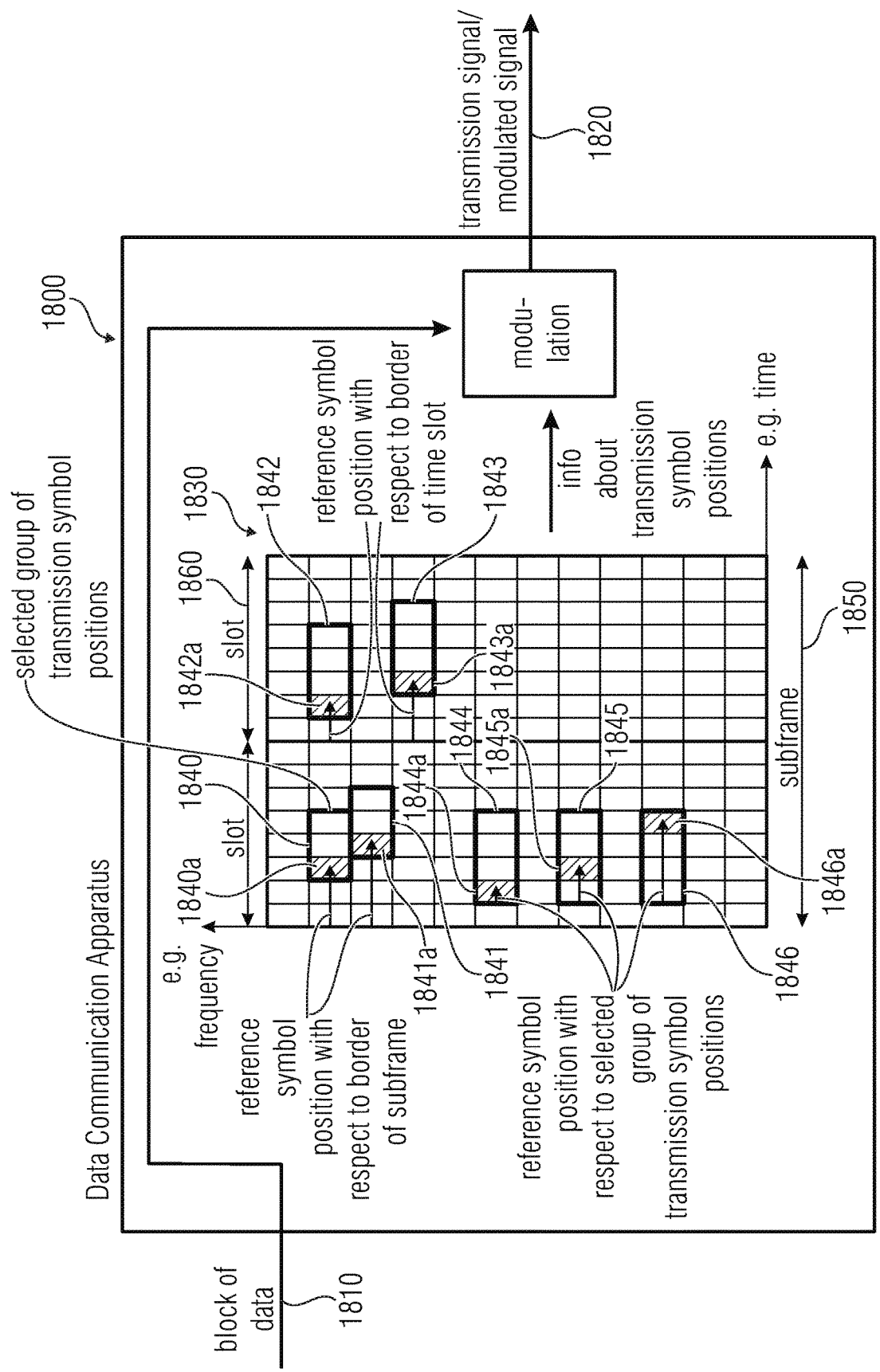
FIG. 18 shows a block schematic diagram of a data communication apparatus, according to another embodiment of the present invention.

FIG. 18 shows a block schematic diagram of a data communication apparatus 1800, according to an embodiment of the present invention. The data communication apparatus 1800 is configured to receive a block of data 1810 and to provide, on the basis thereof, a transmission signal or a modulated signal 1820. The data communication apparatus 1800 is configured to transmit one or more blocks of data within a frame comprising a two-dimensional grid of transmission symbol positions, which is represented at reference numeral 1830. The data communication apparatus is configured to select a group of transmission symbol positions (for example, a group 1840, a group 1841, a group 1842, a group 1843, a group 1844, a group 1845 and/or a group 1846), which is a subset of the two-dimensional grid of transmission symbol positions, for a transmission of a data portion (for example, of the block of data). The selected group of transmission symbol positions may have a length which is designated as "short transmission time interval".

The data communication apparatus is configured to determine which one or more symbol positions (for example, within one or more of the groups 1840 to 1846) are used as one or more reference symbol positions based on the selection of the group of transmission symbol positions or together with the selection of the group of transmission symbol positions. The reference symbol positions are variable with respect to the one or more borders of time slots of the frame or with respect to one or more borders of subframes of the frame. Alternatively or in addition, the one or more reference symbol positions may be variable with respect to the selected group of transmission symbol positions (to which the reference symbol positions are associated).

In other words, the data communication apparatus may be very flexible in selecting the groups 1840 to 1846 of transmission symbol positions, and the data communication apparatus 1800 is also very flexible in selecting the reference symbol positions.

Taking reference now to the example of FIG. 18, it can be seen that the selected groups 1840, 1841 of transmission symbol positions comprise a same length (in terms of a number of transmission symbol positions) but a shift in time with respect to each other. It should be noted that it is not necessary that the selected groups 1840, 1841 are associated with different frequencies or frequency bins or (sub-)carrier frequencies. Rather, the selected groups 1840,1841 may both be arranged at the same frequency or frequency bin or frequency carrier and may be used alternatively in dependence on a configuration information. As can be seen, a reference symbol position 1840a within the group 1840 has a distance of two symbol positions from a (left-sided) time border of a subframe 1850. In contrast, a reference symbol position 1841a has a distance of three reference symbol positions from said left-sided border of the subframe 1850. Thus, it can be seen that the data communication apparatus 1800 is configured to select groups of transmission symbol positions (for example, groups 1840, 1841) (either simultaneously or successively), wherein the reference symbol positions 1840a, 1841a associated with these selected groups 1840, 1841 have different relative positions with respect to the closest border of a respective subframe in which the selected groups 1840, 1841 are located.

Similarly, it can be seen that the reference symbol position 1842a and the reference symbol position 1843a have different distance (or relative positions) with respect to a time border of a slot 1860 in which the groups 1842, 1843 are located. The (relative) position of the reference symbol position 1842a with respect to the time border of the slot 1860 can be defined as being separated from the border by one reference symbol position. In contrast, the (relative) position of the reference symbol position 1843a relative to the time border of the slot 1860 can be defined as having a different number of symbol positions (for example, two symbol positions) in between. Accordingly, it is apparent that the data communication apparatus 1800 is adapted to choose the reference symbol positions such that the reference symbol positions are variable with respect to borders of time slots of the frame or with respect to borders of subframes of the frame.

Taking reference now to groups 1844, 1845 and 1846, it can be seen that the associated reference symbol positions 1844a, 1845a and 1846a vary with respect to the respective groups 1844, 1845, 1846. As can be seen, the reference symbol position 1844a is at the beginning of the corresponding group 1844, the reference symbol position 1845a is in an inner part of the corresponding group 1845, and the reference symbol position 1846a is at an end of the corresponding group 1846. Thus, it can be said that the reference symbol positions are variable with respect to the corresponding selected group of transmission symbol positions (and with respect to the selected group of transmission symbol positions to which the reference symbol position is associated).

To conclude, the data communication apparatus 1800 may very flexibly choose both the groups of transmission symbol positions (which are associated to the transmission of a block of data) and the reference symbol positions within these selected groups of transmission symbol positions. In particular, the reference symbol positions are not bound to a fixed grid within a subframe or within a slot. Rather, the reference symbol positions can vary even for groups of transmission symbol positions having the same lengths or sizes. The variation of the reference symbol positions can be both relative with respect to (adjacent) borders of time slots of the respective frame or with respect to (adjacent) borders of subframes of the respective frame or with respect to borders of the corresponding group of transmission symbol positions (i.e. with respect to the selected group of transmission symbol positions itself).

Moreover, it should be noted that the selected groups of transmission symbol positions and the selected reference symbol positions may be used for the generation of the transmission signal/modulated signal 1820 in the same manner as described above with respect to the apparatus 1700.

Moreover, it should be noted that the data communication apparatus 1800 can be supplemented by any of the features and functionalities described herein, either individually or in combination.

3. Data Communication Apparatus According to FIG. 19

Figure 19:
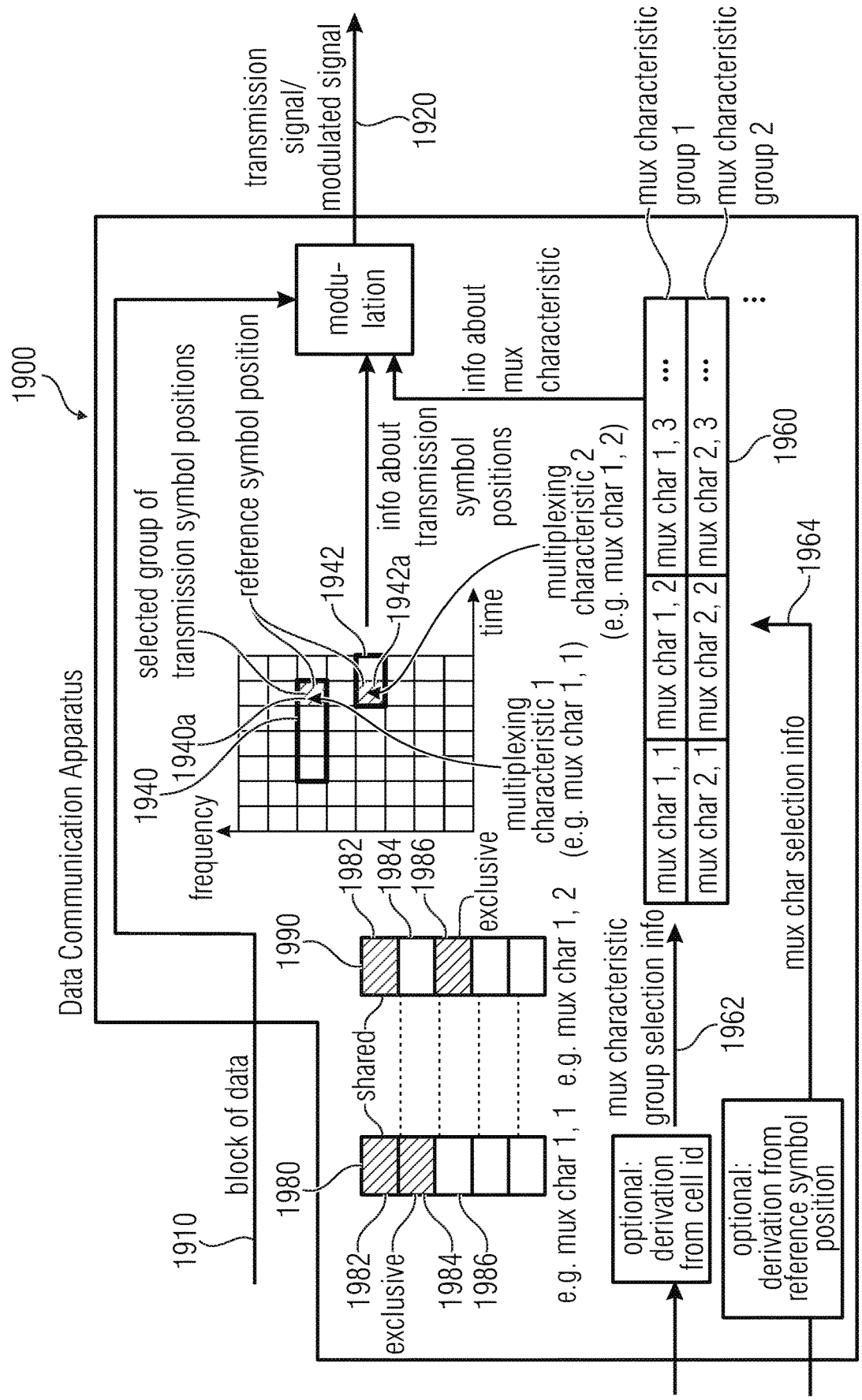
FIG. 19 shows a block schematic diagram of a data communication apparatus, according to another embodiment of the present invention.

FIG. 19 shows a block schematic diagram of a data communication apparatus 1900, according to an embodiment of the present invention.

The data communication apparatus 1900 is similar to the data communication apparatuses 1700, 1800 as described herein. It should be noted that the data communication apparatus can therefore be supplemented by any of the features and functionalities described with respect to the data communication apparatuses 1700 and 1800.

The data communication apparatus 1900 is configured to receive a block of data 1910 and to provide, on the basis thereof, a transmission signal or a modulated signal 1920.

The data communication apparatus 1900 is configured to transmit one or more blocks of data within a frame comprising a two-dimensional grid of transmission symbol positions. The data communication apparatus is configured to select a group of transmission symbol positions, which is a subset of the two-dimensional grid of transmission symbol positions, for a transmission of a data portion.

However, the data communication apparatus is configured to allocate, within the selected group of transmission symbol positions, one or more reference symbol positions. For example, a selected group of transmission symbol positions is designated with 1940 and an associated reference symbol position is designated with 1940a. Another possible group of transmission symbol positions is designated with 1942, and the associated reference symbol position is designated with 1942a.

To allow for a sharing of a reference symbol position with another data communication apparatus, the data communication apparatus 1900 is configured to apply a multiplexing scheme to one or more reference symbols transmitted on a reference symbol position.

The data communication apparatus 1900 comprises one or more of the mechanisms for the selection of the multiplexing characteristic which will be discussed in the following.

According to an aspect, the data communication apparatus is configured to select a multiplexing characteristic of one or more reference symbols, which are associated to the selected group of transmission symbol positions, in dependence on the selection of the group of transmission symbol positions. For example, the data communication apparatus 1900 may choose a first multiplexing characteristic for one or more reference symbols transmitted at reference symbol position 1940a, which is associated with the group 1940 of transmission symbol positions. On the other hand, the data communication apparatus 1900 may select a different multiplexing characteristic for one or more reference symbols transmitted at reference symbol position 1942a, which is associated to the group 1942. Even if the reference symbol positions 1940a and 1942a were at the same position within the two-dimensional time-frequency-grid, different multiplexing characteristics would be chosen by the data communication apparatus 1900 in dependence on whether the data communication apparatus has selected the group 1940 or the group 1942. In other words, the data communication apparatus 1900 may, for example, use a different multiplexing characteristics for a reference symbol which is located at an end of a selected group of transmission symbol positions when compared to a reference symbol which is located at a beginning of a selected group of reference symbol positions. By using such a mechanism (which may be implemented in the same manner in a plurality of data communication apparatuses), it can be ensured that there is no significant distortion between reference symbols transmitted at the same reference symbol position by different data communication apparatuses. In particular, by using such a concept, a large signaling overhead can be avoided.

According to another aspect, the data communication apparatus may be configured to select a multiplexing characteristic of one or more reference symbols, which are associated to the selected group of transmission symbol positions, in dependence on a multiplexing characteristic group selection information defining a group of multiplexing characteristics, and in dependence on a (individual) multiplexing characteristic selection information defining which multiplexing characteristic out of a plurality of multiplexing characteristics contained in a group of multiplexing characteristics defined by the multiplexing group selection information should be used. As shown at reference numeral 1960, the data communication apparatus 1900 may, for example, have a table of multiplexing characteristics, wherein this table comprises at least two groups of multiplexing characteristics. Thus, a multiplexing characteristic group selection information may be used to select a group of multiplexing characteristics for use by the data communication apparatus 1900. On the other hand, a multiplexing characteristic selection information 1964 may be used to select which characteristic out of the selected group of multiplexing characteristics (as defined by the multiplexing characteristic groups selection information 1962) is to be used. Thus, there can be a two-step selection of a multiplexing characteristic. The multiplexing characteristic group selection information 1962 may, for example, be derived in a different manner when compared to the multiplexing characteristic selection information 1964. For example, the multiplexing characteristic groups selection information 1964 may be derived (or changed) only "rarely", for example when handing over from one communication cell to another communication cell. Also, an information item representing the multiplexing characteristic group selection information 1962 may, for example, only be included in a control information at comparatively large time intervals. In contrast, an information item representing the multiplexing characteristic selection information 1964 may be determined (or changed, or updated) more frequently than the multiplexing characteristic group selection information 1962. For example, an information item representing the multiplexing characteristic selection information 1964 may be included in a control information more frequently than an information item defining the multiplexing characteristic groups selection information 1962.

Moreover, the multiplexing characteristics within the first multiplexing characteristic group and the multiplexing characteristic within the second multiplexing characteristic group may be chosen such that any multiplexing characteristic within the first multiplexing characteristic group does not substantively interfere with any of the multiplexing characteristics contained in the second multiplexing characteristic group. Thus, if a data communication apparatus transmits a reference symbol using any of the multiplexing characteristics of the multiplexing characteristic group and, at the same time, another data communication apparatus transmits a reference symbol using any of the multiplexing characteristics defined by the second multiplexing characteristic group, there will be only little or no interference between said transmissions. Thus, if it is ensured that two data communication apparatuses use multiplexing characteristics of different multiplexing characteristic groups, it is not necessary to strictly coordinate which data communication apparatus uses which multiplexing characteristics of its multiplexing characteristic group at which time. Thus, the definition of multiplexing characteristic groups, and the usage of such multiplexing characteristic groups on the side of data communication apparatuses helps to avoid interference between different data communication apparatuses sharing a reference symbol position.

Moreover, it should be noted that the multiplexing characteristics may, for example, be a code division scheme, a frequency division scheme and/or a space division scheme, which has the effect that reference symbols transmitted using different multiplexing characteristics exhibit little or no interference (even if transmitted at the same reference symbol position or groups of reference symbol positions).

According to yet another aspect, the data communication apparatus is configured to select a multiplexing characteristic out of at least a first multiplexing pattern describing transmission symbol positions and a second multiplexing pattern describing transmission symbol positions. The first multiplexing pattern comprises at least one shared transmission symbol position, which is also used by the second multiplexing pattern, and at least one exclusive transmission symbol position which is not used by the second multiplexing pattern. Similarly, the second multiplexing pattern comprises the shared transmission symbol position and at least one exclusive transmission symbol position which is not used by the first multiplexing pattern. Examples for the first multiplexing pattern (which can be understand as a first multiplexing characteristic) and for the second multiplexing pattern (which can be understood as a second multiplexing characteristic) are shown at reference numerals 1980 and 1990. For example, the first multiplexing pattern and the second multiplexing pattern 1980, 1990 comprise, at a first transmission symbol position, a shared transmission symbol position 1982, 1992. However, a second transmission symbol position 1984 is a "exclusive" transmission symbol position, such that there is only a transmission at the second transmission symbol position 1984 if the first multiplexing pattern 1980 is chosen. In contrast, if the second multiplexing pattern 1990 is chosen, there is no transmission at the transmission symbol position 1984 (as shown by a blank rectangle in the multiplexing pattern 1990. Similarly, the first multiplexing pattern 1986 does not comprise a transmission at a third multiplexing pattern position 1986, which is indicated by a blank rectangle of the first multiplexing pattern 1980. On the other hand, the transmission symbol position 1986 is associated with the second multiplexing pattern 1990 as a "exclusive" transmission symbol position.

To conclude, the transmission symbol position 1982 is shared between the first multiplexing pattern 1980 and the second multiplexing pattern 1990, and can therefore be considered as a shared transmission symbol position. The second transmission symbol position 1982 is only associated with the first multiplexing pattern 1980 but not to the second multiplexing pattern 1990, and is therefore an exclusive transmission symbol position for the first multiplexing pattern 1980. The third transmission symbol position 1986 is exclusively associated to the second multiplexing pattern 1990 but not associated to the first multiplexing pattern 1980. It should be noted that, for example, the transmission symbol positions 1982, 1984, 1986 may be associated with a same time but different frequencies. Moreover, it should be noted that usage of such multiplexing patterns may, on the one hand, reduce interference and, on the other hand, allow for a good estimation of channel characteristics (for example, even at an upper frequency bound or at a lower frequency bound).

It should be noted here that the different aspects regarding the selection of the multiplexing characteristic can be used individually, or can be combined.

Moreover, it should be noted that the data communication apparatus 1900 can be supplemented by any of the features and functionalities described herein, either individually or in combination.

4. Data Communication Apparatus According to FIG. 20

Figure 20:
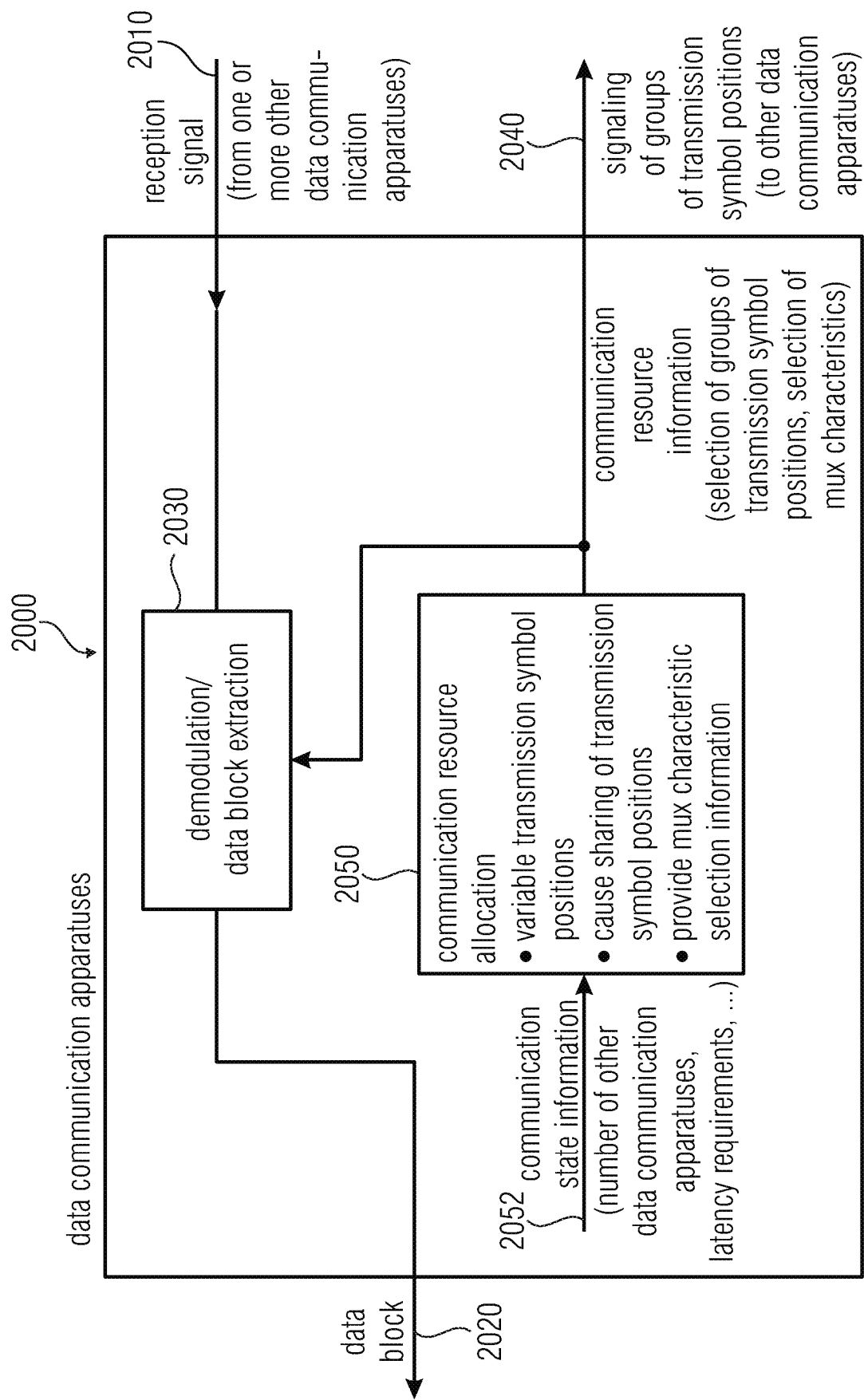
FIG. 20 shows a block schematic diagram of a data communication apparatus, according to another embodiment of the present invention.

FIG. 20 shows a block schematic diagram of a data communication apparatus 2000.

The data communication apparatus 2000 may, for example, be configured to receive a reception signal (for example, for one or more other data communication apparatuses, like, for example, user equipments) and provide, on the basis thereof, one or more data blocks. The reception signal is designated with 2010 and the data blocks are designated with 2020. For example, the data communication apparatus 2000 may comprise a demodulation and/or data block extraction 2030, which is configured to receive the reception signal 2010 and to provide the one or more data blocks 2020 on the basis thereof. The demodulation/data block extraction 2030 also uses information on a communication resource allocation for the demodulation/data block extraction.

In other words, the data communication apparatus 2000 is configured for receiving a plurality of data blocks 2020 from other data communication apparatuses, for example via the reception signal 2010. The data blocks are represented by transmission symbols of multiple groups of transmission symbol positions within a frame comprising a two-dimensional grid of transmission symbol positions. The data communication apparatus is configured to provide a signaling information 2040, and may be configured to signal to the other data communication apparatuses (for example, to user equipments) which group of transmission symbol positions should be used by which of the other data communication apparatuses. In order to perform such a signaling, the data communication apparatus 2000 may, for example, comprise a communication resource allocation 2050 which may, for example, receive a communication state information 2052. The communication state information 2052 may, for example, describe a number of other data communication apparatuses (for example, a number of user equipments) which are linked to the data communication apparatus 2000 (which may serve as a base station or as a coordinating entity). The communication state information 2052 may also comprise an information about latency requirements of the other data communication apparatuses. Furthermore, the communication state information 2052 may also comprise an information about an amount of data to be transmitted by the other data communication apparatuses and/or an information about data rates that may be used by the other data communication apparatuses.

The communication resource allocation 2050 (or, generally speaking, the data communication apparatus 2000) may use one or more concepts for determination and signaling of a resource allocation to the other data communication apparatuses.

For example, the data communication apparatus 2000 may be configured to provide an information describing a group of transmission symbol positions to be used by a given one of the other data communication apparatuses (for example, by a given user equipment). Moreover, the data communication apparatus 2000 may also be configured to provide an information describing a desired relative position of reference symbol positions with respect to the group of transmission symbol positions to be used by the given one of the other data communication apparatuses. Accordingly, a communication resource information 2040, which is transmitted to other data communication apparatuses (for example, to user equipments) for the signaling of groups of transmission symbol positions may carry both the information describing the group of transmission symbol positions to be used and the information describing a desired relative position of reference symbol positions with respect to the signaled group of transmission symbol positions. Thus, the data communication apparatus 2000 may efficiently signal both a group of transmission symbol positions allocated to a given one of the other data communication devices and an allocation of the reference symbol positions within the signaled group of transmission symbol positions.

According to another aspect, the communication resource information may represent an allocation of transmission symbol positions and describe which group of transmission symbol positions should be used by which of the other data communication apparatuses and which of the transmission symbol positions should be used for a transmission of reference symbols by which of the other data communication apparatuses. The data communication apparatus 2000 may be configured to signal different allocations of transmission symbol positions in dependence on a current communication state (for example, in dependence on the communication state information 2052). The transmission symbol positions to be used for the transmission of reference symbols may be variable with respect to borders of time slots of the frame or with respect to borders of subframes of the frame between different allocations of transmission symbol positions or even for a single allocation of transmission symbol positions. Alternatively or in addition, the transmission symbol positions to be used for the transmission of reference symbols may be variable with respect to a corresponding group of transmission symbol positions between different allocations of transmission symbol positions or even for a single allocation of transmission symbol positions. In other words, the data communication apparatus 2000 may be configured to allocate the resources such that the transmission symbol positions to be used for the transmission of reference symbols vary between different resource allocation states or even between different groups of reference symbol positions in a single resource allocation state. Also, different reference symbol positions (for example, relative to one or more adjacent borders of a respective time slot or relative to one or more adjacent borders of a respective subframe, and/or relative to one or more borders of a selected group of transmission symbol positions) may vary. Also, even in a single communication state, these relative positions of the transmission symbol positions to be used for the transmission of reference symbols may vary among reference symbol positions associated with different groups of transmission symbol positions. For example, even in a single communication state, the data communication apparatus 2000 may make the resource allocation such that a first group of a given number of transmission symbol positions may have its associated reference symbol at the beginning, and another group of the same given number of transmission symbol positions may have its associated reference symbol in an inner part or at the end of the group. Furthermore, the data communication apparatus 2000 may have the flexibility to vary said (relative) positions of the reference symbol positions in the case that the current communication state changes. Accordingly, the data communication apparatus 2000 may provide the signaling information 2040 such that the signaling information instructs other data communication apparatuses (for example, the data communication apparatuses 1700, 1800, 1900) to use different allocations of reference symbol positions, as described above with respect to FIGS. 17, 18 and 19.

To further conclude, the data communication apparatus 2000 is configured to provide flexible communication resource information, which allows to flexible bring the data communication apparatuses 1700, 1800, 1900 into a plurality of different states as described above.

According to an aspect of the invention, the data communication apparatus 2000 is configured to provide the communication resource information to at least two other data communication apparatuses (for example, user equipments), to cause a sharing between the at least two other data communication apparatuses of a transmission symbol position for a transmission of a reference symbol. In other words, the data communication apparatus 2000 may be configured to provide the signaling information or communication resource information 2040 such that the signaling information or communication resource information 2040 instructs at least two other data communication devices (user equipments) to transmit at least one reference symbol in a shared (identical) transmission symbol positions (for example, at the same time). Thus, the data communication apparatus 2000 may coordinate a sharing of a transmission symbol position by at least two other data communication apparatuses (for example, user equipments), which results in a substantial saving of physical resources. In this regard, the data communication apparatus 2000 may be configured to recognize under which situations a sharing of a transmission symbol position for the transmission of a reference symbol makes sense (for example, by providing a substantial saving of physical resources without excessively degrading a quality of a channel estimation). For example, different approaches may be used by the data communication apparatus to decide when such a sharing should be used. For example, the data communication apparatus 2000 may cause a sharing of a transmission symbol position when it is found that it is acceptable, in terms of an obtainable channel estimation quality, to place a reference symbol position at the end of a first group of transmission symbol positions associated with a first other data communication apparatus and to place a reference symbol position at a beginning of an immediately subsequent (but overlapping) group of transmission symbol positions associated with a second other data communication apparatus.

Moreover, different strategies for deciding how such a sharing of transmission symbol positions should be made can also be used.

Moreover, it should be noted that the data communication apparatus 2000 may also be configured to signal an appropriate selection of multiplexing characteristics in case that a sharing of a transmission symbol position is instructed by the data communication apparatus 2000 via the communication resource information 2040. For example, the data communication apparatus 2000 may use the communication resource information 2040 to instruct two other data communication apparatuses sharing a transmission symbol position for the transmission of a reference symbol to use different multiplexing characteristics. For example, the data communication apparatus 2000 my provide the communication resource information 2040 such that a multiplexing characteristic selection information signaled to a first of the other data communication apparatuses indicates a different multiplexing characteristic when compared to a multiplexing characteristic selection information signaled to another one of the other data communication apparatuses. Consequently, the data communication apparatus 2000 may control the other data communication apparatuses to use such multiplexing characteristics which cause small or negligible mutual interference when a transmission symbol position is shared.

Alternatively or in addition, the data communication apparatus 2000 may be configured to instruct two other data communication apparatuses to use the multiplexing patterns 1980, 1990 (wherein one of the other data communication apparatuses is instructed to use the multiplexing pattern 1980, and wherein another data communication apparatus is instructed to use the multiplexing pattern 1990).

To conclude, the data communication apparatus 2000 may not only instruct the other data communication apparatuses to share a transmission symbol position, but may also instruct the other data communication apparatuses to use multiplexing characteristics which reduce or avoid mutual distortions.

To conclude, it should be noted that the data communication apparatus 2000 may provide the communication resource information 2040, which may, for example, comprise the information describing the relative position of a reference symbol position with respect to a selected group of transmission symbol positions, as described with respect to the data communication apparatus 1700. Alternatively or in addition, the communication resource information 2040 may be used to signal the variable allocation of reference symbol positions as described with respect to the data communication apparatus 1800. Moreover, the communication resource information 2040 may, for example, comprise any of the information that may be used by the data communication apparatus 1900 performing the allocation of transmission symbol positions and the decision about the multiplexing characteristics to be used. Thus, the communication resource information 2040 may comprise one or several of the information items used by data communication apparatuses 1700, 1800, 1900.

In addition, it should be noted that the data communication apparatus 2000 may be supplemented or amended to perform any of the functionalities described herein, either individually or in combination. Also, the data communication apparatus 2000 may be adapted to control any of the functionalities of the data communication apparatuses 1700, 1800, 1900 by providing an appropriate communication resource information 2040.

5. Overview Over the Proposed Technical Solutions

In the following, the proposed technical solution will be discussed in some more detail. In particular, an overview of important points will be provided, and different important aspects of the invention will be described.

According to an aspect of the invention, novel short-transmission-time-interval patterns (sTTI patterns) for the uplink are created. Details will be described below taking reference to FIG. 3.

According to another aspect, sTTI designs and overlap DMRS symbols are proposed. In particular, it is proposed to multiplex them in a suitable manner (for example, using code-division, and/or frequency division, and/or space division. Moreover, according to an aspect of the invention, patterns for a simplified scheduling are defined. For example, a pattern from a predefined codebook may be signaled. Alternatively, or in addition, it is possible to semi-statically signal a pattern. According to an aspect, they can be dynamically scheduled with an uplink (UL) grant. For example, they can be dynamically scheduled from a subset depending on the sTTI length. According to another aspect, the patterns can be matched with SRS scheduling settings.

According to another aspect, control information is provided to the user equipment to schedule DMRS positions to use in a given grant (or in several given grants). The control information can be before or after PUSCH (1a-1b; 2a-2c; 3a-3d; 4a-4e). An sTTI length may be defined otherwise.

According to another aspect of the invention, a control information for DMRS multiplexing mode may be provided and/or used. The control information may, for example, define a multiplexing mode to use (for example, code, frequency, and/or spatial, and/or non-orthogonal). Optionally, the control information may comprise additional parameters for a mode: for example, DMRS cyclic shift or frequency pattern.

According to another aspect of the invention, predefined patterns, as defined above (as sTTI designs an overlap DMRS symbols) may be used for statically assigning the positions and lengths of data and DMRS symbols. These predefined patterns may, for example, depend on sTTI lengths, assigned PRBs (physical resource blocks), subcarriers, and/or a signaled mode.

According to another aspect, control information is provided or used to signal a subset of possible sTTI structures for a user equipment (UE) to use in a given UL grant or in several given UL grants. This concept may be used while defining the sTTI length otherwise. The concept may also be used while (semi-)statically defining the sTTI length. Reference is made, for example, to the cases 2d, 3a, 3d or 3a, 3b, 3c, 3d, 3e, as described herein.

Novel sTTI Patterns for the Uplink

In the following, some novel sTTI patterns will be described, which can be used for an uplink from a user equipment (for example, designated as a data communication apparatus for transmitting one or more blocks of data) to a base station or coordinating station (for example, designated as a data communication apparatus for receiving one or more blocks of data). The sTTI patterns described here may, for example, be used by the user equipment to determine the physical resources to be used for transmitting a data block and for transmitting the demodulation reference signal. Similarly, the novel sTTI blocks may be used by the base station or coordinating device to properly extract data blocks from a reception signal. In other words, the knowledge of the novel sTTI patterns can be used by a base station to decide which of the received symbols are reference symbols (and can therefore be used for a channel estimation) and which of the received symbols are data symbols and can be evaluated for an extraction of data blocks after the channel estimation.

Figure 1:
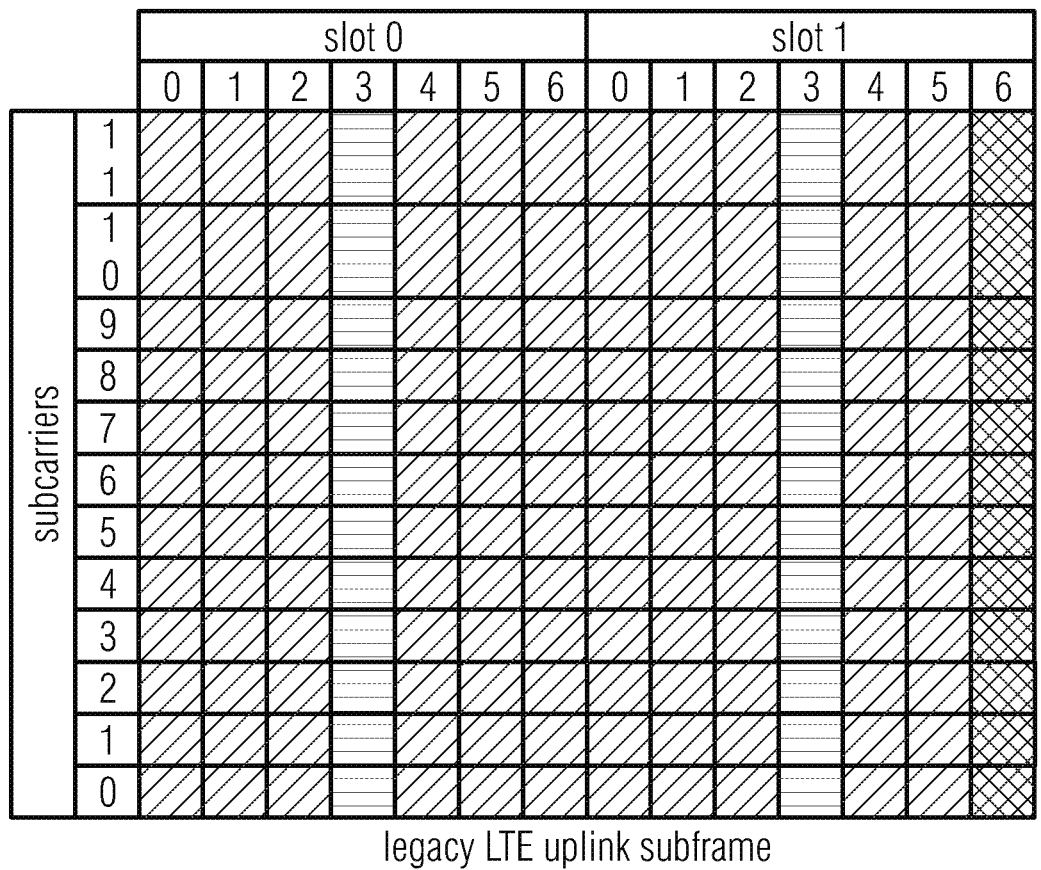
FIG. 1 shows a schematic representation of a legacy LTE uplink subframe.
Figure 2A:
FIGS. 2a and 2b show a schematic representation of an example of an uplink subframe with sTTI length ¾ and 2 OFDM symbols.
Figure 2B:
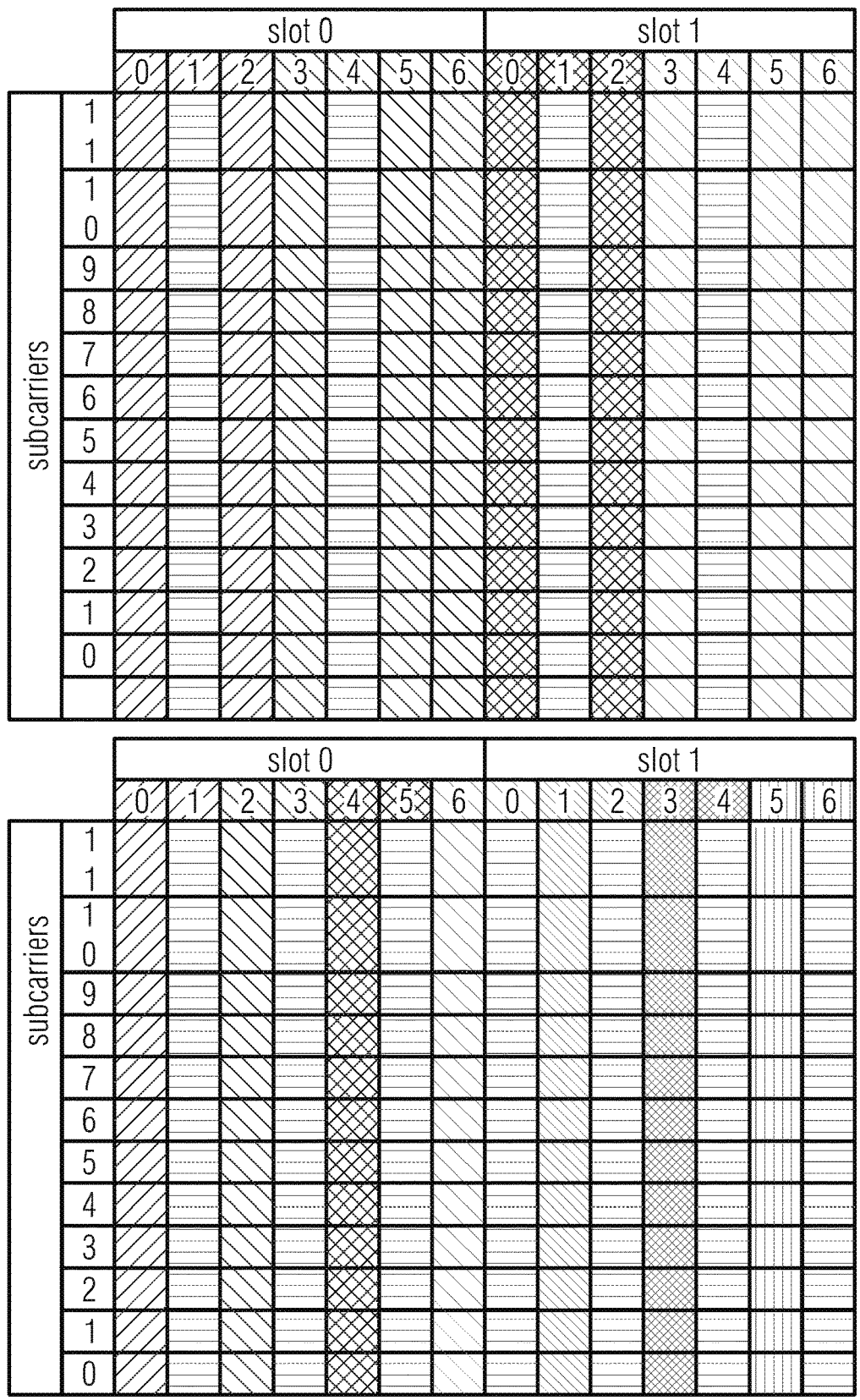
Figure 3A:
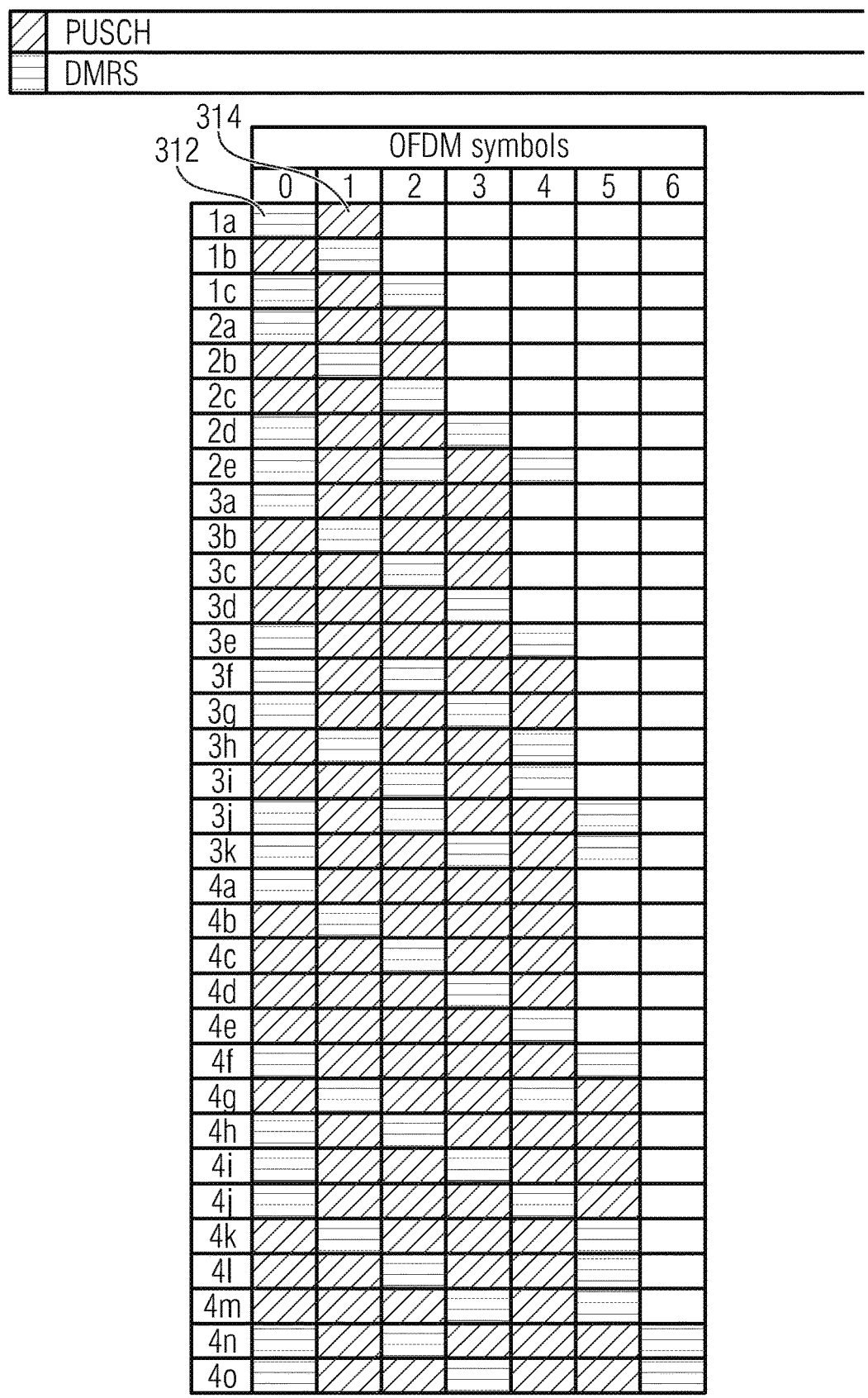
FIGS. 3a and 3b show a schematic representation of sTTI possible DMRS positions.
Figure 3B:

Coming from legacy LTE, each TTI (transmission time interval) contains its own demodulation reference symbols (DMRS reference symbols). However, possible positions for the reference symbols are shown in FIG. 3 (FIGS. 3a and 3b). It is proposed to support various patterns of PUSCH and DMRS symbols and combinations thereof.

Reference is now made to FIGS. 3a and 3b, wherein each line (from the line designated with 1a to the line designated with 6p) shows a group of transmission symbol positions to be associated to a user equipment or, generally, to a data communication apparatus. It should be noted that each column (labeled from 0 to 6) designates a (temporal) symbol position for an OFDM symbol. However, even though the different alternatives are shown in one line only, each of the alternatives (from 1a to 6g) can be expanded to a plurality of frequency bins or frequency subcarriers. In each of the lines in FIGS. 3a and 3b, the transmission symbol positions "PUSCH" and "DMRS" together may represent a "selected group of transmission symbol positions", and the transmission symbol position "DMRS" may represent a reference symbol position. The data communication apparatuses described herein may choose any of the cases shown in the lines of FIGS. 3a and 3b, i.e. any of the combinations of a selected group of transmission symbol positions together with an associated reference symbol position.

Cases 1a, 1b and 1c describe groups of transmission symbol positions which each comprises one PUSCH (physical uplink shared channel) OFDM symbol time interval. For example, a first OFDM symbol time interval 312 comprises one or more reference symbol positions (in the case of multiple reference symbol positions, extending in the frequency direction). A second OFDM symbol time interval 314 comprises one or more symbol positions for uplink data (in the case of multiple transmission symbol positions, extending in the frequency direction). Thus, in the case 1a a first OFDM symbol time interval 312 is associated with one or more reference symbols, a second OFDM time interval 314 is associated with one or more "useful data" symbols. In a case 1b, the order of the useful data and of the reference symbol or reference symbol(s) is reversed. Thus, it can be flexibly decided whether the reference symbol or reference symbols should be arranged at the beginning or at the end of the respective group of transmission symbol positions (each having a temporal extension of two of the OFDM symbol time intervals). In the case 1c, one OFDM symbol time interval is allocated to "useful data" and two of the time intervals (of the group of symbol positions having a temporal extension of three OFDM symbol time intervals) are allocated to reference symbols.

In the cases 2a to 2e, two of the OFDM symbol time intervals are associated to "useful data". As can be seen in cases 2a, 2b and 2c, it can be chosen as to whether as a symbol position at the beginning of the group (case 2a), a symbol position in an inner part of the group (case 2b) or a symbol position at the end of the group (case 2c) should be used for the one or more reference symbols. As can be seen in case 2d, it is also possible to choose a case in which there is a reference symbol position both at the beginning of the group and at the end of a group. Case 2e is another special case, wherein there is a reference symbol at the beginning of the group and at the end of the group and in an inner part of the group. This causes a relatively large overhead, but may be advantageous in the case of a strongly varying channel.

Cases 3a to 3k show situations in which there are three OFDM symbol time intervals used for "useful data". The reference symbols can be arranged at the beginning of a group (case 3a) or at the end of a group (case 3b) or within an inner part of the group (cases 3b and 3c) or both at the beginning and at the end of the group (case 3e). In addition, some additional special cases are shown. The reference symbol position can be both at the beginning of the group and in an inner part of the group (cases 3f and 3g) or both in the inner part of a group and at the end of the group (cases 3h and 3i). Also, reference symbol positions can be at the beginning of a group, in an inner part of the group and at an end of the group (cases 3g and 3k).

Similar resource allocations can also be made for the case of four OFDM symbol intervals being used for "useful data". The reference symbol positions can be at the beginning (case 4a) or at the end (case 4e) or in an inner part (cases 4b-4d) of the selected group. The reference symbol positions can also be both at the beginning and at the end of the selected group (case 4f). Also, there can be several reference symbol positions within the inner part (4g). The cases of reference symbol positions at the beginning and in an inner part of the group (cases 4a-4j), reference symbols in an inner part and at the end of the group (cases 4k-4m) and reference symbols at the beginning and in an inner part and at the end of the group (cases 4n-4p) are also possible.

Resource allocations for 5 OFDM symbol time intervals with useful data are designated as cases 5a-5g, and resource allocations with six OFDM symbol time intervals being used for useful data are designated with 6a-6g.

It should be noted here that in the above examples, it was assumed that there should usually be one OFDM symbol time interval associated with useful data between two OFDM symbol time intervals associated with reference symbols, in order to obtain a reasonable resource efficiency. Also, it was assumed that, for realistic group length, it is typically sufficient to have only one OFDM symbol time interval within an inner part of the group used for a reference symbol position, provided that there is a reference symbol position at the beginning or at the end of the group (cf. the special case 4g).

To conclude, both the user equipment and the base station mentioned herein should be capable to handle all of the cases 1a to 6g as shown in FIG. 3b, or at least a reasonable subset of these cases, in order to provide a sufficient variation possibility for the assignment of reference symbol positions.

It should be noted that, without multiplexing (i.e., without sharing a reference symbol position between multiple data communication apparatuses), the variants with the DMRS in the middle are advantageous (for example, cases 2b, 3b, 3c, 4c). When multiplexing (sharing) the DMRS for more than one transmission time interval (or for more than one user equipment, or for more than one group of transmission symbol positions), it is beneficial to place the DMRS symbol more to the (common) center of the two (subsequent) multiplexed (shared) TTIs. For example, this means that the DMRS symbol should be placed at an end of a first group of transmission symbol positions and at the beginning of a subsequent (overlapping) second group of transmission symbol position.

Figure 4:
FIG. 4 shows a schematic representation of an example (a) without an (b) with DMRS multiplexing.

An example is shown in FIG. 4. A first line (designated with a) shows a sequence of two groups of transmission symbol positions of type 2b. In a second line (in the example b), UE1 (for example, a first user equipment) is assigned pattern 2c (as shown in FIG. 3a), and UE2 (for example, a second user equipment) is assigned pattern 2a (for example, as shown in FIG. 3a). Accordingly, the DMRS for both user equipment is multiplexed "in OFDM symbol 2" (for example, in a third OFDM symbol time interval of a sub-frame).

Thus, the base station may instruct the first user equipment to use a group of transmission symbol positions having a temporal extension of three OFDM symbol time intervals and having a reference symbol position at its end. Furthermore, the base station may instruct a second user equipment to use a group of transmission symbol positions covering there OFDM symbol time intervals and having the reference symbol position at the beginning. Also, it can be signaled that the group of transmission symbol positions used by the second user equipment should start two OFDM symbol time intervals later than the group of transmission symbol positions associated with a first user equipment.

The multiplexing of the DMRS symbols can be done in any suitable manner. For example, a code division and/or frequency division and/or space division can be used. This can be done in the beginning and/or in the beginning of a transmission.

In the following, some further examples will be described.

Figure 6:
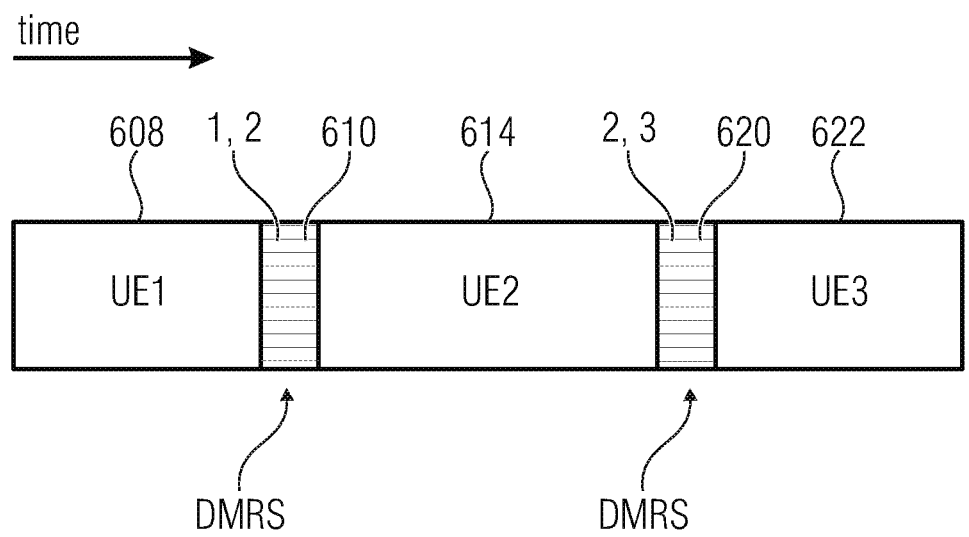
FIG. 6 shows a schematic representation of a multiplexing of user equipments (UEs) with different transmission length.

FIG. 6 shows UE1 and UE3 (user equipment 1 and user equipment 3) sending a short transmission with one shared DMRS. UE 2 (user equipment 2) having longer transmission shares two DMRS symbols at the beginning and at the end of the transmission. This can also be done for other reasons, e.g. bad signal-to-signal ratio (SNR) or fast changing channel conditions.

Worded differently, it actually makes sense to have groups of transmission symbol positions having a reference symbol position both at the beginning and at the end. On the other hand, it also makes sense to have groups of transmission symbol positions only having a reference symbol position at the end or only having a reference symbol position at the beginning. For example, a group of transmission symbol positions according to example 1b in FIG. 3a may be associated to user equipment 1, a group of transmission symbol positions according to example 3e in FIG. 3a may be associated with user equipment 2, and a group of transmission symbol positions according to example 1a in FIG. 3a may be associated to user equipment 3.

To conclude, FIG. 6 shows a flexible positioning of a shared DMRS symbols with different transmission lengths.

Figure 5:
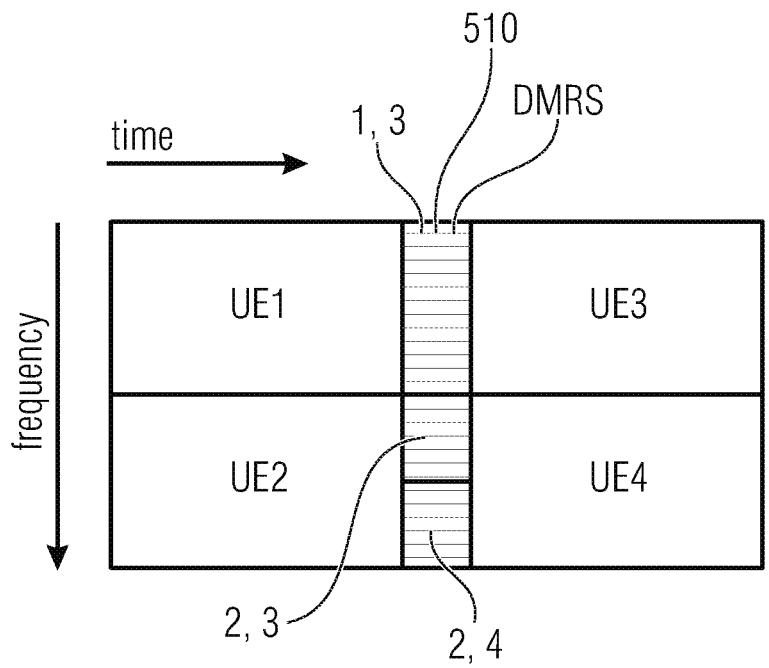
FIG. 5 shows a schematic representation of a multiplexing of user equipments (UEs) with different bandwidth allocations.

FIG. 5 shows a multiplexing of user equipment with different bandwidth allocations. It can be seen that one user equipment can be multiplexed with more than one other user equipment when the frequency allocations are different.

Taking reference now to FIG. 5, a group of transmission symbol positions comprising a temporal length of (for example) three OFDN symbol time intervals and having a frequency extension of (for example) two frequency bins or frequency subcarriers may be associated with user equipment 1. This may correspond to a frequency-spread version of the example 2c shown in FIG. 3a (adjusted to a frequency extension of two frequency bins or frequency subcarriers).

Similarly, a group of transmission symbol positions comprising a temporal extension of, for example, three OFDM symbol time intervals and having a frequency extension of two frequency bins or frequency subcarriers may be associated with user equipment 2. It also corresponds to configuration 2c as shown in FIG. 3a, extended to a frequency extension of two frequency bins or frequency subcarriers. The groups of transmission symbol positions associated with user equipment 1 and 2 both comprise the reference symbols at the end. User equipment 3 has associated a group of transmission symbol positions having a temporal extension of, for example, three OFDM symbol time intervals and a frequency extension of three frequency bins or subcarriers. It may correspond to example 2a as shown in FIG. 3a, with the frequency extension adjusted to three frequency bins or subcarriers. User equipment 4 may have associated a group of transmission symbol positions having a temporal extension of, for example, 3 OFDM symbol time intervals and a frequency extension of one frequency bin or frequency subcarrier. Both user equipment 3 and user equipment 4 may be configured such that the reference symbol positions are at the beginning of the respective groups of transmission symbol positions. Accordingly, the group of transmission symbol positions associated with user equipment 1 only overlaps with the group of transmission symbol positions associated with user equipment 3. On the other hand, the group of transmission symbol positions associated with user equipment 2 overlaps with the group of transmission symbol positions associated with user equipment 3 and with the group of transmission symbol positions associated with user equipment 4. Again, it can be seen that the base station may provide communication resource information which allows for a very flexible allocation of groups of transmission symbol positions to the user equipment.

The combination of different transmission lengths and bandwidth allocations is shown in FIG. 7. Here, user equipment 1 (UE1) and user equipment 3 (UE3) multiplex their DRMS, as well as user equipment 2, 3 and 4 (UE2, UE3 and UE4).

Figure 7A:
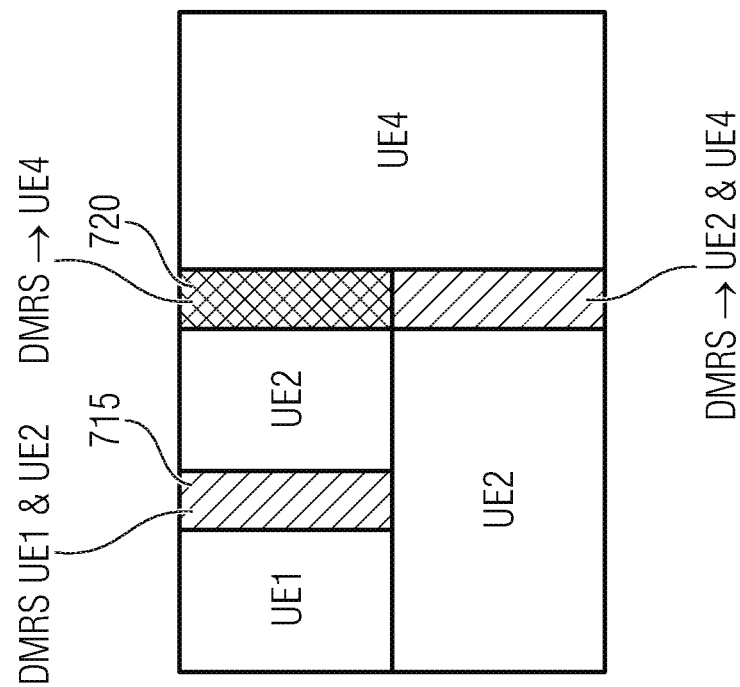
FIGS. 7a and 7b show a schematic representation of examples of a combination of DMRS multiplexing for a multi-user scenario over frequency and time domains.

Taking reference to FIG. 7a, it can be seen that, in a first frequency range, a first group of transmission symbol positions is allocated to a first user equipment UE1, and that a second group of transmission symbol positions, which overlaps with the previous group of transmission symbol positions, is allocated to a user equipment UE3. Thus, there is a sharing of one or more reference symbol positions between user equipment 1 and user equipment 3. In another, second frequency range, a group of transmission symbol positions is associated to a second user equipment 2. Moreover, a temporal end of the group of transmission symbol positions associated to the user equipment 3 is identical to a temporal end of a group of transmission symbol positions associated to the user equipment 2. However, it should be noted that the group of transmission symbol positions associated to user equipment 1 comprises reference symbol positions at the end. The group of transmission symbol positions associated with user equipment 3 comprises reference symbol positions both at the beginning and at the end. The group of transmission symbol positions associated with user equipment 2 comprises reference symbol positions only at the end. Moreover, a group of transmission symbol positions covering both the first frequency range and the second frequency range is associated to a fourth user equipment UE4. The group of transmission symbol positions associated to the fourth user device only comprises reference symbol positions at the beginning. Thus, the reference symbol positions at the end of the group of transmission symbol positions associated to the third user equipment overlap with the reference symbol positions at the beginning of the group of transmission symbol positions associated with the fourth user equipment in the first frequency range. Similarly, the reference symbol positions at the end of the group of transmission symbol positions associated with the second user equipment overlap the reference symbol positions associated with the fourth user equipment in the second frequency range. Accordingly, it can be seen that there is a possibility for a flexible resource allocation. In particular, a different number of groups of transmission symbol positions may be arranged in a first frequency range when compared to a second frequency range, while still sharing reference symbol positions with a group of transmission symbol positions covering both frequency ranges and having the reference symbol positions at the beginning. However, the allocation scheme shown in FIG. 7a can naturally be mirrored with respect to time and/or with respect to frequency.

Figure 7B:
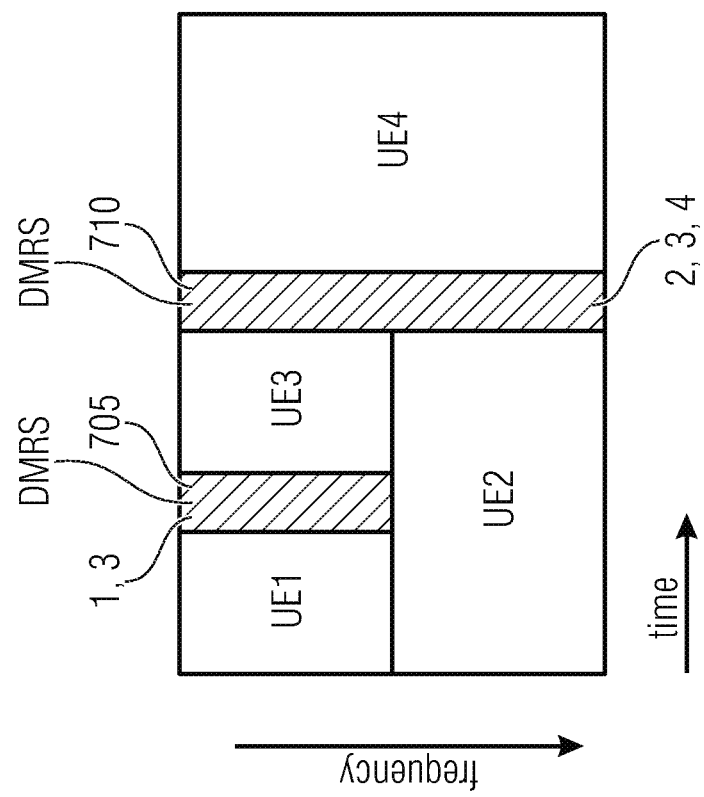

A scenario shown in FIG. 7b differs from a scenario shown in FIG. 7a in that a group of transmission symbol positions lying between the group of transmission symbol positions associated with the first user equipment and the group of transmission symbol positions associated with the fourth user equipment only overlaps with the group of transmission symbol positions associated with the first user equipment, but does not overlap with the group of transmission symbol positions associated with the fourth user equipment. Accordingly, the reference symbol positions associated with the fourth user equipment and lying between the first frequency range are not shared, but only used by the fourth user equipment. However, the fourth user equipment still shares the reference symbol positions in the second frequency range with the second user equipment. Thus, it is apparent that it is not necessary to use each and every possibility for sharing reference symbol positions. Rather, in some cases, it may be unnecessary to share reference symbol positions, even if there would be a possibility to do so without creating additional overhead.

To conclude, both the base station and the user equipment can use a very flexible scheme for the allocation of groups of transmission symbol positions, wherein, at some points, there may be a sharing of transmission symbol positions and wherein, at other points, there may be no sharing of reference symbol positions between neighboring groups of transmission symbol positions.

It should also be noted that the frame structure is shown in FIG. 7, as well as any other frame structures described herein, can be assigned semi-statically to certain subcarriers or signaled dynamically with an uplink resource grant.

sTTI Design and Overlap of DMRS Symbols

Figure 8:
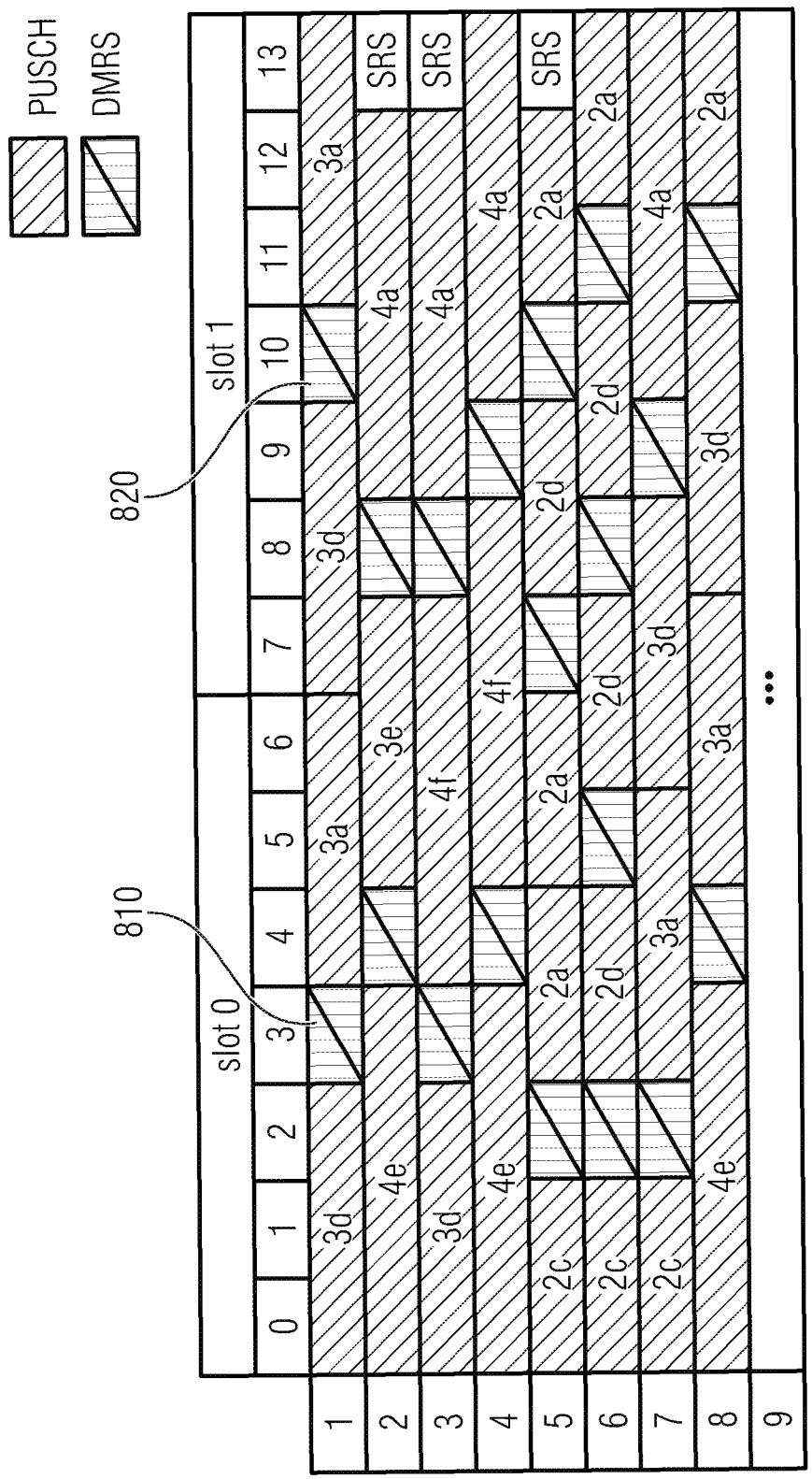
FIG. 8 shows a schematic representation of PUSCH sills (short transmission time intervals) and corresponding DMRS slots in orange (or shown in a different hatching)

Embodiments according to the invention create or use sub-frame designs that allow multiplexing of DMRS symbols between multiple STTIs with a length of 1, 2, 3 and 4 OFDM PUSCH symbols. Some of the possible variations are shown in FIG. 8. However, it should be noted that FIG.

8 shows some samples only, and that it may be desirable in some embodiments, that they contain each and every possible variation. However, it is naturally not necessary that each and every possible variation is contained. However, it may, in some embodiments, be sufficient to implement some or all of the configurations shown in FIG. 8, or even different configurations.

Taking reference to FIG. 8, it should be noted that the individual lines (numbered 1 to 8) describe different allocations of transmission symbol positions to multiple user equipment. However, it should be noted that, as an example, each line comprises (or represents) 14 OFDM symbol time intervals (labeled from 0-13), such that each line represents a duration of an LTE sub-frame. As can be seen in a first line, a group of transmission symbol positions of type 3d having a reference symbol position at an end and a group of transmission symbol positions of type 3a, having a reference symbol position at a beginning, are allocated to the first seven OFDM symbol time intervals, wherein there is an overlap of the reference symbol positions. The same structure is repeated for the next seven OFDM symbol time intervals, wherein there is no overlap between the second group of transmission time intervals and the third group of transmission time intervals. Accordingly, the reference symbol positions are in the fourth OFDM symbol time interval (interval "3") and in the $11^{th}$ OFDM symbol time interval (interval "10"), with a sharing in both cases.

In a second line, yet another sequence is shown. A first group of transmission symbol positions is of type 4e, having a temporal extension of five OFDM symbol time intervals with the reference symbol position at the end. A second group of transmission symbol positions is of type 3e, and comprises a total temporal extension of five OFDM symbol time intervals, and comprises a reference symbol position at the beginning and a reference symbol position at the end. A third group of transmission symbol positions is of type 4a, having a total temporal extension of five OFDM symbol time intervals. There is an overlap between the first and the second group of transmission symbol positions, and there is also an overlap in the second and the third group of transmission symbol positions. Moreover, there is a SRS symbol at the end (OFDM symbol index 13).

A similar scenario is also shown in the third row, with some variation in the length of the groups of transmission symbol positions.

In the fourth row, a scenario is shown in which there are three groups of transmission symbol positions, each comprising four useful bits. A first group of transmission symbol positions comprises a reference symbol position at the end, a second group of transmission symbol positions (type 4f) comprises reference symbol positions both at the beginning and at the end, and a third group of transmission symbol positions (4a) comprises a reference symbol position only at the beginning. Accordingly, a particularly efficient channel estimation can be made, with a comparatively small overhead in terms of reference symbol positions.

A similar case is also shown in a sixth row, but for temporally shorter groups of transmission symbol positions.

A seventh row and an eighth row show cases which are similar to the example shown in the fourth row, but with unequal length of groups of transmission symbol positions having a shared reference symbol position. In other words, in the examples shown in the first row, in the seventh row and in the eighth row, a first and a second group of transmission symbol positions have a shared reference symbol position, and a third and a fourth group of transmission symbol positions also have a shared reference symbol position. However, there is no sharing of a reference symbol position between the second group of transmission symbol positions and the third group of transmission symbol positions. Also, there is no reference symbol at all at a transition from the second group of transmission symbol positions to the third group of transmission symbol positions in the examples of the first, seventh and eighth row.

Taking reference now to the example in the fifth row, there is a sharing of a reference symbol position between the first group of transmission symbol positions and the second group of transmission symbol positions. There is no sharing of a reference symbol position between the second group of transmission symbol positions and the third group of transmission symbol positions. On the other hand, there is a sharing between the third group of transmission symbol positions and the fourth group of transmission symbol positions, and there is also a sharing of a reference symbol between the fourth group of transmission symbol positions and the fifth group of transmission symbol positions. Thus, it can be seen that there can also be an irregular pattern between which groups of transmission symbol positions there is a sharing of transmission symbol positions.

Moreover, it should be noted that, in the above example of FIG. 8, the groups of transmission symbol positions have been numbered in accordance with their temporal position (first group, second group, third group, etc.).

Moreover, it should be noted that, in some embodiments, different of the configurations shown in the different lines of FIG. 8 can be used in a common physical resource block (PRB) in some embodiments. In some embodiments, it is sufficient that there is the possibility to switch between the usage of the different configurations shown in the different lines of FIG. 8 (or between at least some of the different configurations shown in the lines of FIG. 8). For example, the base station may signal which of the configurations should be used (or which combination of configurations should be used). On the other hand, the user of equipment should be able to react to the signaling from the base station, and should be able to adapt to the different allocations signaled by the base stations. Accordingly, the user equipment should effectively be able to handle at least some of the configurations shown in the lines of FIG. 8, and the base station should be able to control the usage of different configurations.

Control Information to User Equipment to Signal DMRS Position to Use in a Given Grant or in Several Given Grants To dynamically design the position of DMRS symbols, control information can be added signaling a user equipment where the DMRS symbol is to be transmitted. In a simple case, this can be implemented as a 1-bit Boolean signaling the DMRS position to be in the beginning or at the end of the transmission (for example, in the beginning of a selected group of transmission symbol positions or at the end of a selected group of transmission symbol positions). An example for such signaling is shown in the table of FIG. 13.

FIG. 13 shows, in the form of a table, a DCI message (downlink control information). Some of the fields of the downlink control information may have a meaning as defined in a current LTE standard, for example in a version of the LTE standard effective at the date of filing of the present application. However, a 1-bit DMRS position information is added to the downlink control information. This 1-bit DMRS position information indicates, for example, a DMRS symbol position at a beginning or at an end of a transmission (for example, at the beginning or at the end of a group of transmission symbol positions associated with a user equipment).

Alternatively, a scheme with an enumerated field allowing the definition of several DMRS positions (for example, more than two DMRS positions) may be used. This can be implemented by choosing a subset of transmission designs as shown in FIG. 4. An example of such a concept is shown in the table of FIG. 14.

FIG. 14 shows, in the form of a table, a downlink control information message (DCI message) with an added 1-bit (or 2-bit) DCI position field. As can be seen in FIG. 14, a field titled "DMRS position" is added to the downlink control information message (for example, to a downlink control information messages as defined by a version of the LTE standard effective at the date of filing of the present application). Other contents of the downlink control information message can be seen from FIG. 14. As can be seen in FIG. 14, the DMRS position information may comprise one bit in the case of a sTTI having two symbols (or having a length of two symbol positions). In this case, the DMRS position information may distinguish between a case in which the DMRS position is at the "front" and a case in which the DMRS position is at the back (for example, of a selected group of transmission symbol positions). However, in the case that a sTTI comprises three or more symbols (or comprises a length of three or more symbols), two bits may be used for the DMRS position information. For example, a DMRS position at the front, at the back, in the middle or both at the front and at the back may be signaled by a 2-bit DMRS position information. For example, the DMRS position information may switch between cases 6a, 6g, 6d and 5g as described above (for example, as shown in FIG. 3).

It should be noted here that the "DMRS position" information may correspond to the "information describing a relative position of a reference symbol position with respect to a selected group", as mentioned above.

However, it should be noted that different signaling options for the DMRS position information are also possible.

Control Information for DMRS Multiplexing Mode

When multiplexing the DMRS between two users, it is beneficial for a base station (or for an "eNB") to transmit additional parameters such as which orthogonal code or frequency pattern should be used by each user equipment.

When keeping the so-called "Zadoff-Chu" sequences, a cyclic shift can be used to distinguish the users. In other words, a cyclic shift information which may be contained in the DCI message, may be used to determine an appropriate multiplexing characteristic for the transmission of reference symbols in a shared reference symbol position.

For other multiplexing schemes, the DMRS cyclic shift field can be reused to signal the multiplexing pattern to use. This becomes especially relevant when one or more other users are using MIMO. Then, the sequences from each antenna need to be separated.

Figure 9:
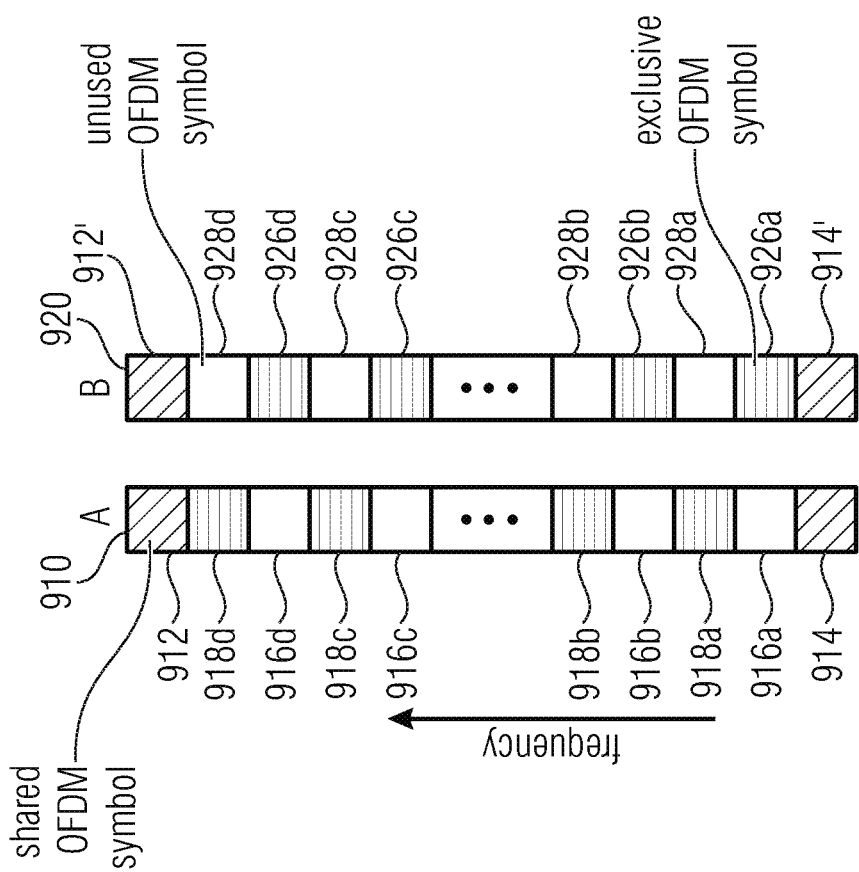
FIG. 9 shows a schematic representation of a frequency multiplexing of DMRS, wherein a shared symbol is used at edges for better interpolation.

An example in FIG. 9 shows two different modes (or multiplexing characteristics) ("mode A and mode B") that can be signaled by one bit. The sources between users can also be shared, so that the DRMS is multiplexed on the same resources. Thus, interpolation performance is increased especially at the edge positions of the allocated subband. It is sufficient to share the resources, so that the superposition of the signal is exploited at the receiver. That means, a simple addition of the DRMS symbols is sufficient.

In the following, a frequency multiplexing of DMRS, as shown in FIG. 9, will be briefly explained. FIG. 9 shows a frequency multiplexing of DMRS, with shared symbol at the edges for better interpolation.

A first representation "a" with reference numeral 910 describes which OFDM symbols over frequency (for a given instant in time) are used as a first alternative when multiplexing a plurality of reference symbols. A second alternative is shown in the reference numeral 920 ("b").

As can be seen at reference numeral 910, an OFDM symbol 912 having a highest frequency (within a frequency range used for transmission of a set of DMRS symbols) is a shared OFDM symbol, which is also used in the second alternative 920. Similarly, an OFDM symbol 914 having a lowest frequency (within the frequency range used for the provision of a plurality of DMRS symbols) is also a shared OFDM symbol, which is used in the second alternative as well. Between the OFDM symbols 914 and 912, there is an alternation of unused OFDM symbols 916a-916d and of "exclusive" OFDM symbols 918a-918d, which are only used in the first alternative 910, but not in the second alternative 920. The second alternative also comprises shared OFDM symbols 914', 912' at the lowest and at the highest frequency. These shared OFDM symbols 914', 912' correspond to the shared OFDM symbols 914, 912 (in that they have the same frequency). Moreover, the second alternative also comprises, between the OFDM symbols 914' and 912', an alternation of exclusive OFDM symbols 926a-926d, which are only used in the second alternative but not in the first alternative, and of unused OFDM symbols 928a-928d. It should be noted that the OFDM symbols 926a-926d correspond in frequency to the OFDM symbols 916a-916b. Similarly, the OFDM symbols 928a-928d correspond in frequency to the OFDM symbols 918a-918d.

Accordingly, it should be noted that OFDM symbols 914, 914' and 912, 912' are shared between the first alternative "a" and the second alternative "b" of a frequency multiplexing. Between the shared OFDM symbols 914, 914', 912, 912', there are exclusively used OFDM symbols, which are either used in the first alternative "a" or in the second alternative "b".

To conclude, FIG. 9 shows a frequency multiplexing of a sequence of DMRS symbols, which can be used in case that a selected group of transmission symbol positions comprises a reasonably large number of frequency bins or subcarriers (i.e., a sufficiently large frequency range such that a frequency spreading or multiplexing as shown in FIG. 9 is possible). The frequency multiplexing as shown in FIG. 9 can then be applied to include reference symbols at a selected reference symbol position (for example, at the end of the group of transmission symbol positions and at the beginning of a subsequent and overlapping group of transmission symbol positions, with one alternative being used by a first user equipment and another alternative being used by a second user equipment).

Inter-Cell Interference Coordination (ICIC) for DMRS Multiplexing

When a DMRS symbol is transmitted, it can cause interference in neighboring cells. This can be minimized by transmitting known and different patterns at the same time.

It is proposed to do this by specifying DMRS groups. Each group contains a subset of possible multiplexing patterns. The group can either be explicitly signaled or implicitly derived from other sets of parameters such as a cell identifier (cell ID).

Figure 10:
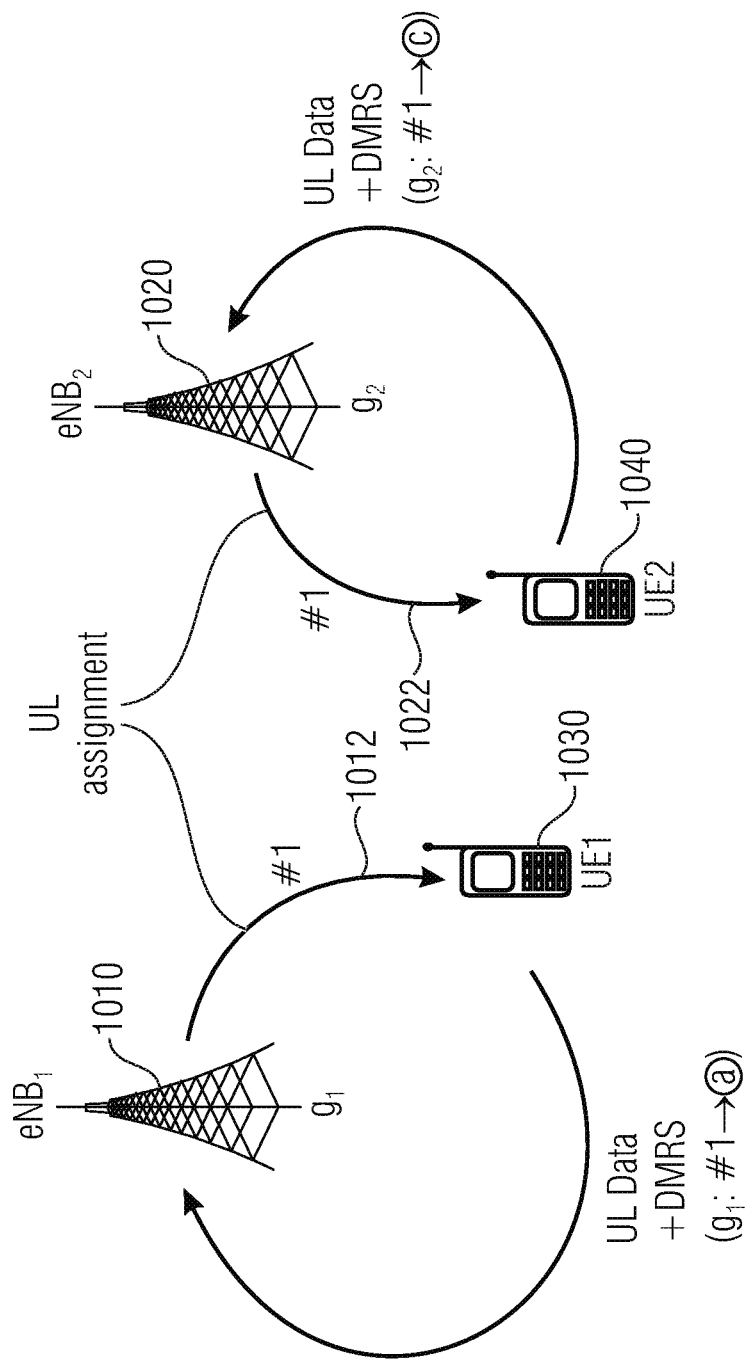
FIG. 10 shows an ICIC (intra-cell-interference-coordination) for DMRS sequences by introducing orthogonal groups.

FIG. 10 shows a concept for inter-cell interference coordination for DMRS sequences by introducing orthogonal groups. FIG. 10 shows two neighboring eNBs 1010, 1020 (eNB1 and eNB2), each sending a UL assignment to one or more UEs (UE1 and UE2 in this case). The eNBs can be considered as base stations or as data communication devices. The user equipment 1030, 1040 can also be considered as data communication devices. Thus, base station 1010 sends a first uplink assignment 1012 to user equipment 1030, and base station 1020 sends a second uplink assignment 1022 to user equipment 1040. Both uplink assignments (UL assignments) specify the DMRS pattern (or DMRS multiplexing characteristic) as #1 (no. 1). At the user equipment side, pattern #1 is taken from the group subset. In this case for user equipment 1 (UE1), this is pattern "a" (#1) from group g1. In other words, group 1 is assigned to user equipment 1, wherein this assignment can be made in different manners, as will be described below. Moreover, it should be noted that the user equipment 1 1030 transmits uplink data and DMRS data to the first base station 1010, wherein a multiplexing pattern "a" defined by group 1, pattern #1 is used for the transmission of the DMRS. Similarly, the user equipment 1040 transmits uplink data and DMRS, wherein a multiplexing pattern defined by group 2, pattern #1 is used for the DMRS.

Taking reference now to FIG. 15, a grouping of DMRS multiplexing pattern is shown. In other words, table 3 of FIG. 15 shows a possible grouping (groups 1-3) of patterns (patterns "a" to "l"). Patterns "a" to "l" can be chosen to keep interference reasonably small. In particular, the patterns may be chosen such that the interference between patterns of different groups are particularly small.

Figure 11:
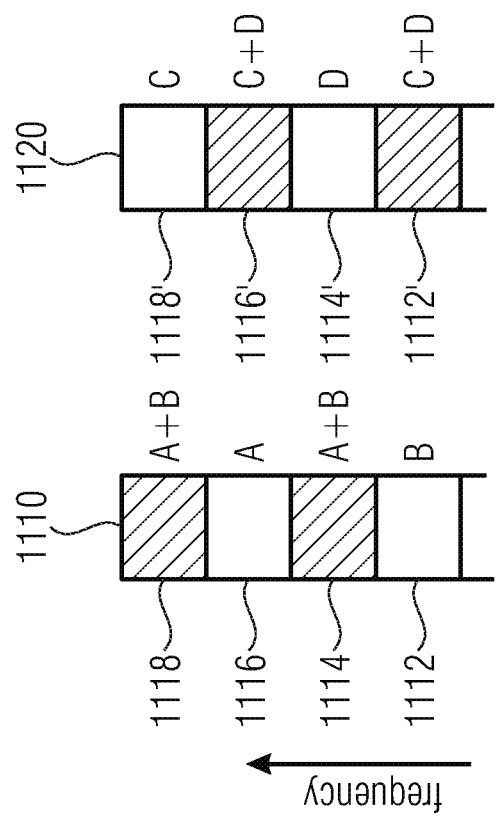
FIG. 11 shows a schematic representation of an example representation of two patterns, wherein A to D are different users transmitting.

It should be noted that this concept reduces signaling that may be used by the base station eNB as only a pattern number (pattern #1-4) (2-bit) has to be signaled while maintaining inter-cell orthogonality of the DMRS sequences. An example implementation of two such patterns is shown in FIG. 11. In the example implementation of two patterns, "A" to "D" are different users transmitting. This equally spreads the four users sharing DMRS (A-D) on a time frequency resource to three simultaneously transmitting users. Taking reference now to FIG. 11, two multiplexing patterns are shown. A first multiplexing pattern 1110 defines, for example, at which transmission symbol position which user equipment (data communication apparatus) should transmit. It should be noted that the transmission symbol positions defined by the first multiplexing pattern 1110 are typically temporally simultaneous, but at different frequencies (different frequency bins or different subcarriers). For example, it can be seen that a user equipment "A" should transmit (e.g. an OFDM modulation symbol) at a second frequency 1114, a third frequency 1116 and a fourth frequency 1118. In contrast, user equipment "B" should transmit at a first frequency 1112, at the second frequency 1114 and at the fourth frequency 1118. The multiplexing pattern for device "A" (second frequency, third frequency, fourth frequency) may, for example, correspond to multiplexing pattern "a". Similarly, the multiplexing pattern for user equipment "B" (first frequency, second frequency, fourth frequency) may correspond to multiplexing pattern "b". A third multiplexing pattern 1120 defines that user equipment "C" transmits at the first frequency 1112', at the third frequency 1116' and at the fourth frequency 1118'. Moreover, the second multiplexing pattern 1120 defines that the user equipment "D" should transmit at the first frequency 1112', at the second frequency 1114' and at the third frequency 1116'. Thus, the multiplexing pattern of device "C" (first frequency, third frequency, fourth frequency) may correspond to multiplexing pattern "c" (or, alternatively to multiplexing pattern "e"). The multiplexing pattern for device "D" (first frequency, second frequency, third frequency) may correspond to multiplexing pattern "d" (or, alternatively, to multiplexing pattern "f").

Thus, the multiplexing patterns 1110, 1120 avoid, even under worst case conditions, that there are four user equipment transmitting at the same time.

However, it should be noted that different multiplexing patterns naturally can also be used.

Predefined Patterns

Predefined patterns as defined in the section "sTTI design an overlap of DMRS symbols" for statically assigning the positions and lengths of data and DMRS symbols will be described in the following.

To reduce the signaling overhead, configured or predefined patterns can be used. These can be defined depending on e.g. the transmission length (sTTI), assigned frequency (PRBs), component carriers or subcarriers used, transmission time or mode signaled to the transmitter (user equipment UE).

Figure 12:
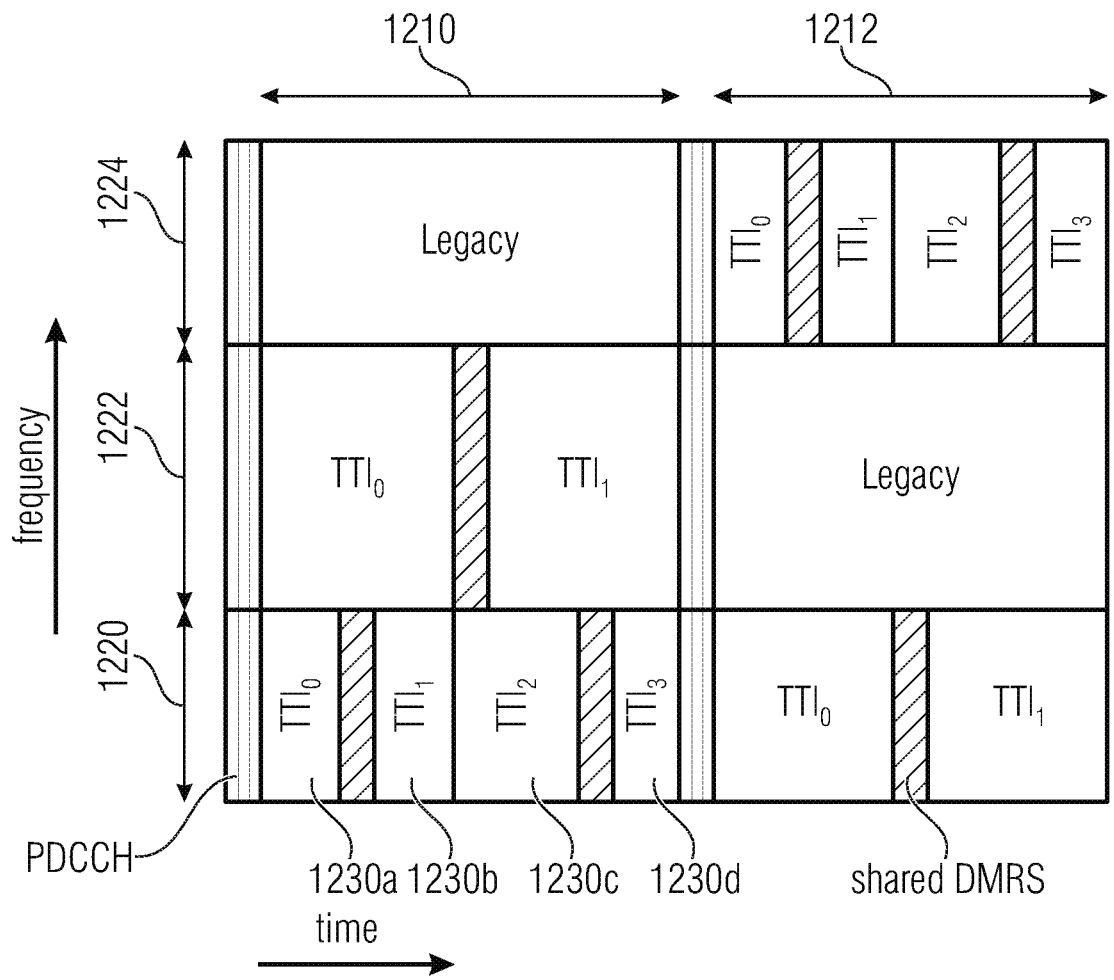
FIG. 12 shows a schematic representation of an example assignment of TTI length and DMRS position in frequency and time on an LTE resource grid.

The user equipment can then use the transmission pattern according to the assigned resources. The example in FIG. 12 shows an assignment. Depending on which TTI (transmission time intervals) and which frequency a user is scheduled, it will use the defined transmission time interval length and DMRS position.

In other words, a base station may signal which overall resource allocation scheme out of a plurality of possible overall resource allocation schemes should be used. This selected resource allocation scheme then forms the basis for the resource allocation to the individual user equipment. For example, an individual information, describing the resources to be used by an individual user equipment may, for example, define, in some manner, which of the groups of transmission symbol positions defined by the overall resource allocation scheme should be used by the given user equipment. On the basis of this information, a user equipment may obtain additional information (for example, the position of the reference symbols) from the overall resource allocation scheme. Thus, it is no longer necessary to signal each and every detail of a resource allocation, as long as a user equipment can determine, on the basis of his knowledge of the overall resource allocation scheme, these features (for example, the reference symbol positions, the temporal extension of its group of transmission symbol positions and/or the frequency extension of its allocated group of transmission symbol positions.

An example assignment of TTI length and DMRS position in frequency and time on an LTE resource grid is shown in FIG. 12. In other words, FIG. 12 shows a representation of an overall resource allocation in a two-dimensional grid of transmission symbol positions. It can be seen that in that a first time portion 1210 there is a plurality of different groups of transmission symbol positions having different temporal extensions. In a first frequency range 1220, there are four groups, wherein a first pair of groups 1230a, 1230b shares reference symbol positions, and wherein a second pair of groups 1230c, 1230d also shares reference symbol positions. In a second frequency range 1222, there are two groups of transmission symbol positions, also sharing reference symbol positions. In a third frequency range 1224, there is only one group of transmission symbol positions. It can be seen that, even in the first time portion 1210, the reference symbol positions vary over frequency, i.e., do to follow a fixed grid (for example, even within a physical resource block).

In a second time portion 1212, there is a similar resource allocation. However, there are two groups of transmission symbol positions in the first frequency range, there is one group of transmission symbol positions in the second frequency range, and there are four groups of transmission symbol positions in the third frequency range.

Thus, for example, one may only assign which of the predefined groups of transmission symbol positions should be used by which of the user equipment. On the basis of its knowledge of the overall resource allocation scheme, user equipment continues to derive other parameters that may be used (temporal extension, frequency extension, position of the reference symbols).

General Remarks Regarding sTTI Concept

For FDD and TDD systems, a novel radio frame structure is currently under discussion for a better support traffic for ultra-reliable low latency communications (URLLC). However, by introducing the short TTI (sTTI) concept in future LTE releases, see e.g. the 3GPP working item on latency reduction, the restriction to subframe sizes can be overcome. The current working assumption for future LTE Release 14 is to allow the sTTI concept with the following configurations for:

FDD systems:
  Downlink (PDSCH), working assumption: sTTI with 2, 3-4, 7 OFDM symbols (OS)
  Uplink (PUSCH), working assumption: sTTI with 2, 3-4 OFDM symbols (OS)
TDD system working assumption:
  1-slot (=7 OFDM symbols) sTTI for sPDSCH/sPDCCH/sPUSCH/sPUCCH In future mobile communication standards referred to as New Radio (NR) or 5G, the length of a TTI may be reduced to support a shortened version of only 1 OFDM symbol or at least the configurations described above, which are proposed for URLLC in LTE Rel. 14.

General remarks regarding waveform generation/waveform analysis in the data communication apparatuses In embodiments, the transceiver (or the data communication apparatus) can be a base station (or a user equipment) in the wireless communication system, and the data signal (or transmission signal, or modulated signal) is an IFFT based signal, the IFFT based signal having a plurality of frames, the frame including a plurality of sub-frames.

For example, the IFFT (inverse fast Fourier transform) based signal may include OFDM with CP or DFT-s-OFDM with CP and IFFT-based waveforms without CP. For example, OFDM with CP may be used for downlink transmission. For example, DFT-s-OFDM with CP may be used for uplink transmission.

CONCLUSIONS

To conclude, embodiments according to the invention create a flexible DMRS mapping for sTTI in the uplink. Aspects according to the present invention can be summarized as follows:
E1) Novel sTTI patterns for the uplink (see FIG. 3)
E2) sTTI designs and overlap DMRS symbols
  multiplexing them in a suitable manner (e.g. Code-division, frequency division, space division)
  define patterns for simplified scheduling
    (signal a) pattern from a predefined codebook
    semi-statically signal the pattern
  dynamically schedule them with the UL grant.
    From a subset depending on the sTTI length
  Match the patterns with SRS scheduling settings
E3) control information to UE to signal DMRS position to use in a (or several) given Grant
  before or after PUSCH (1a-1b; 2a-2c; 3a-3d; 4a-4e)
  sTTI length is defined otherwise
E4) control information for DMRS multiplexing mode
  e.g. multiplexing mode to use e.g. code, frequency, special or non-orthogonal
  additional parameters for mode: e.g DMRS cyclic shift or frequency pattern.
E5) predefined patterns as defined in E2 for statically assigning the positions and lengths of data and DMRS symbols
  depending on e.g sTTI length, assigned PRBs, subcarriers, signaled mode.
E6) control information to signal a subset of possible sTTI structures for a UE to use in a (or several) given UL grant
  while defining the sTTI length otherwise
  while (semi-)statically defining the sTTI length
  e.g. 2d, 3a, 3d or 3a, 3b, 3c, 3d, 3e Embodiments according to the invention allow for a flexible positioning of sills of same or different lengths within a sub-frame. It is possible to reduce overhead by multiplexing DMRS of neighboring sills. This can be from the same user equipment or different user equipment.

Some embodiments according to the invention create an improved signaling.

Embodiments according to the invention may, for example, be used in latency-constraining (mission-critical) communication services.

6. Methods

FIGS. 21 to 25 show flowcharts of a methods for transmitting one or more blocks of data, according to embodiments of the present invention.

FIGS. 26 to 28 show flowcharts of a methods for receiving one or more blocks of data, according to embodiments of the present invention.

These methods are based on the same considerations as the apparatuses described herein. The methods can be supplemented by any of the features and functionalities described herein.

7. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations and equivalents as fall within the true spirit and scope of the present invention.

8. References

[1] 3GPP R1-163723, Ericsson, Qualcomm. WF on DMRS for sPUSCH. s.I.
[2] 3GPP TS 36.321 V13.1.0 (2016-03), p. 42ff.
[3] 3GPP TS 36.331 V13.1.0 (2016-03), p. 354.

The invention claimed is:

1. A data communication apparatus, for transmitting one or more blocks of data within a frame comprising a two-dimensional grid of transmission symbol positions,
wherein the data communication apparatus is configured to select a group of transmission symbol positions, which is a subset of the two-dimensional grid of transmission symbol positions, for a transmission of a data portion; and
wherein the data communication apparatus is configured to select one or more reference symbol positions associated to the selected group of transmission symbol positions, out of a plurality of possibilities, based on an information describing a desired relative position of the reference symbol position with respect to the selected group of transmission symbol positions;
wherein the data communication apparatus is configured to receive an information indicating whether a reference symbol position is at a beginning of a selected group of transmission symbol positions or at an end of a selected group of transmission symbol positions, or
wherein the data communication apparatus is configured to receive an information indicating whether a reference symbol position is at a beginning of a selected group of transmission symbol positions or at an end of a selected group of transmission symbol positions or in an inner part of a selected group of transmission symbol positions or whether there are reference symbol positions both at a beginning and at an end of a selected group of transmission symbol positions;
wherein the data communication apparatus is configured to receive the information describing a desired relative position of the reference symbol position with respect to the selected group of transmission symbol positions from another data communication device coordinating the operation of multiple data communication devices.

2. The data communication apparatus according to claim 1, wherein the information indicating whether a reference symbol position is at a beginning of a selected group of transmission symbol positions or at an end of a selected group of transmission symbol positions is a 1-bit information.

3. The data communication apparatus according to claim 1, wherein the information indicating whether a reference symbol position is at a beginning of a selected group of transmission symbol positions or at an end of a selected group of transmission symbol positions or in an inner part of a selected group of transmission symbol positions or whether there are reference symbol positions both at a beginning and at an end of a selected group of transmission symbol positions is a 2-bit information.

4. The data communication apparatus according to claim 1, wherein data communication apparatus is configured to selectively evaluate a 1-bit information describing a desired relative position of a reference symbol position with respect to the selected group of transmission symbol positions or a 2-bit information describing a desired relative position of a reference symbol position with respect to the selected group of transmission symbol positions in dependence on whether the selected group of transmission symbol positions comprises a length of two transmission symbol positions or a length or more than two transmission symbol positions; or wherein data communication apparatus is configured to selectively evaluate a 1-bit information describing a desired relative position of a reference symbol position with respect to the selected group of transmission symbol positions or a 2-bit information describing a desired relative position of a reference symbol position with respect to the selected group of transmission symbol positions in dependence on whether the selected group of transmission symbol positions comprises two transmission symbol positions or more than two transmission symbol positions in dependence on a temporal extension of a selected group of transmission symbol positions.

5. A data communication apparatus for receiving a plurality of data blocks from other data communication apparatuses, wherein the data blocks are represented by transmission symbols of multiple groups of transmission symbol positions within a frame comprising a two-dimensional grid of transmission symbol positions, wherein the data communication apparatus is configured to signal to the other data communication apparatuses which group of transmission symbol positions should be used by which of the other data communication apparatuses, wherein the data communication apparatus is configured to provide an information describing a group of transmission symbol positions to be used by a given one of the other data communication apparatuses, and an information describing a desired relative position of reference symbol positions with respect to the group of transmission symbol positions to be used by the given one of the other data communication apparatuses;

wherein the data communication apparatus is configured to provide an information indicating whether a reference symbol position is at a beginning of a group of transmission symbol positions to be used by the given one of the other data communication apparatuses or at an end of a group of transmission symbol positions to be used by the given one of the other data communication apparatuses, or wherein the data communication apparatus is configured to provide an information indicating whether a reference symbol position is at a beginning of a group of transmission symbol positions to be used by the given one of the other data communication apparatuses or at an end of a group of transmission symbol positions to be used by the given one of the other data communication apparatuses or in an inner part of a group of transmission symbol positions to be used by the given one of the other data communication apparatuses or whether there are reference symbol positions both at a beginning and at an end of a group of transmission symbol positions to be used by the given one of the other data communication apparatuses;

wherein the data communication apparatus is configured to provide, in at least one of the possible communication states, a communication resource information which indicates that a reference symbol position is located at a beginning of a group of transmission symbol positions to be used by one of the other data communication apparatuses.

6. The data communication apparatus according to claim 5, wherein the information indicating whether a reference symbol position is at a beginning of a group of transmission symbol positions to be used by the given one of the other data communication apparatuses or at an end of a group of transmission symbol positions to be used by the given one of the other data communication apparatuses is a 1-bit information.

7. The data communication apparatus according to claim 5, wherein the information indicating whether a reference symbol position is at a beginning of a group of transmission symbol positions to be used by the given one of the other data communication apparatuses or at an end of a group of transmission symbol positions to be used by the given one of the other data communication apparatuses or in an inner part of a group of transmission symbol positions to be used by the given one of the other data communication apparatuses or whether there are reference symbol positions both at a beginning and at an end of a group of transmission symbol positions to be used by the given one of the other data communication apparatuses is a 2-bit information.

8. The data communication apparatus according to claim 5, wherein data communication apparatus is configured to selectively provide the information describing a desired relative position of reference symbol positions with respect to the group of transmission symbol positions to be used by the given one of the other data communication apparatuses as a 1-bit information in case the respective group of transmission symbol positions comprises 2 transmission symbol positions and as a 2-bit information in case the respective group of transmission symbol positions comprises more than 2 transmission symbol positions; or wherein data communication apparatus is configured to selectively provide the information describing a desired relative position of reference symbol positions with respect to the group of transmission symbol positions to be used by the given one of the other data communication apparatuses as a 1-bit information or as a 2-bit information in dependence on a temporal extension of the respective group of transmission symbol positions.

9. The data communication apparatus according to claim 5, wherein the data communication apparatus is configured to provide, in at least one of the possible communication states, a communication resource information which indicates that a reference symbol position is located at an end of a group of transmission symbol positions to be used by one of the other data communication apparatuses.

10. The data communication apparatus according to claim 5, wherein the data communication apparatus is configured to provide, in at least one of the possible communication states, a communication resource information which indicates that a reference symbol position is located in an inner part of a group of transmission symbol positions to be used by one of the other data communication apparatuses.

11. The data communication apparatus according to claim 5, wherein the data communication apparatus is configured to provide, in at least one of the possible communication states, a communication resource information which indicates that reference symbol positions are located both at the beginning and at the end of a group of transmission symbol positions to be used by one of the other data communication apparatuses.

12. The data communication apparatus according to claim 5, wherein the data communication apparatus is configured to allow for allocation of groups of transmission symbol positions exhibiting different lengths, and wherein the data communication apparatus is configured to allow for an allocation of groups of transmission symbol positions exhibiting same length but different associated reference symbol positions during a single communication state and/or during different communication states.

13. A method for transmitting one or more blocks of data within a frame comprising a two-dimensional grid of transmission symbol positions,
- wherein the method comprises selecting a group of transmission symbol positions, which is a subset of the two-dimensional grid of transmission symbol positions, for a transmission of a data portion; and
- wherein the method comprises selecting one or more reference symbol positions associated to the selected group of transmission symbol positions, out of a plurality of possibilities, based on an information describing a desired relative position of the reference symbol positions with respect to the selected group of transmission symbol positions;
- wherein the method comprises receiving an information indicating whether a reference symbol position is at a beginning of a selected group of transmission symbol positions or at an end of a selected group of transmission symbol positions, or
- wherein the method comprises receiving an information indicating whether a reference symbol position is at a beginning of a selected group of transmission symbol positions or at an end of a selected group of transmission symbol positions or in an inner part of a selected group of transmission symbol positions or whether there are reference symbol positions both at a beginning and at an end of a selected group of transmission symbol positions;
- wherein the method comprise receiving the information describing a desired relative position of the reference symbol position with respect to the selected group of transmission symbol positions from another data communication device coordinating the operation of multiple data communication devices.

14. A method for receiving a plurality of data blocks from other data communication apparatuses at a data communication apparatus, wherein the data blocks are represented by transmission symbols of multiple groups of transmission symbol positions within a frame comprising a two-dimensional grid of transmission symbol positions,
- wherein the method comprises signaling to the other data communication apparatuses which group of transmission symbol positions should be used by which of the other data communication apparatuses,
- wherein the method comprises providing an information describing a group of transmission symbol positions to be used by a given one of the other data communication apparatuses, and an information describing a desired relative position of reference symbol positions with respect to the group of transmission symbol positions to be used by the given one of the other data communication apparatuses;
- wherein the method comprises providing an information indicating whether a reference symbol position is at a beginning of a group of transmission symbol positions to be used by the given one of the other data communication apparatuses or at an end of a group of transmission symbol positions to be used by the given one of the other data communication apparatuses, or
- wherein the method comprises providing an information indicating whether a reference symbol position is at a beginning of a group of transmission symbol positions to be used by the given one of the other data communication apparatuses or at an end of a group of transmission symbol positions to be used by the given one of the other data communication apparatuses or in an inner part of a group of transmission symbol positions to be used by the given one of the other data communication apparatuses or whether there are reference symbol positions both at a beginning and at an end of a group of transmission symbol positions to be used by the given one of the other data communication apparatuses;
- wherein the method comprises providing, in at least one of the possible communication states, a communication resource information which indicates that a reference symbol position is located at a beginning of a group of transmission symbol positions to be used by one of the other data communication apparatuses.

15. A non-transitory digital storage medium having a computer program stored thereon to perform the method according to claim 13 or claim 14, when said computer program is run by a computer.

* * * * *